United States Patent [19]

Kihara et al.

[11] Patent Number: 5,541,683
[45] Date of Patent: Jul. 30, 1996

[54] INSTANT FILM PACK AND INSTANT CAMERA

[75] Inventors: Masanobu Kihara; Takeshi Tamura; Katsuyoshi Asakura, all of Kanagawa; Hiroshi Ohmura; Hidefumi Obo, both of Saitama; Ryuzi Uemura, Kanagawa, all of Japan

[73] Assignee: Fuji Photo Film Co., Ltd., Kanagawa, Japan

[21] Appl. No.: 355,248

[22] Filed: Dec. 2, 1994

[30] Foreign Application Priority Data

| Dec. 2, 1993 | [JP] | Japan | 5-303105 |
| Dec. 2, 1993 | [JP] | Japan | 5-303106 |
| Mar. 7, 1994 | [JP] | Japan | 6-036007 |
| Mar. 7, 1994 | [JP] | Japan | 6-036011 |

[51] Int. Cl.⁶ .............. G03B 17/52; G03B 17/26
[52] U.S. Cl. .............. 354/86; 354/276; 354/277
[58] Field of Search .............. 354/84, 85, 86, 354/276, 277

[56] References Cited

U.S. PATENT DOCUMENTS 4,823,155  4/1989  Kataoka et al. .
4,972,218  11/1990  Weissburg .................. 354/276

FOREIGN PATENT DOCUMENTS 63-150954  10/1988  Japan .

Primary Examiner—A. A. Mathews
Attorney, Agent, or Firm—Young & Thompson

[57] ABSTRACT

An instant film pack for use with an instant camera has a case, with a back wall and a front wall in which an exposure aperture is formed. 10 rectangular film units are stacked and contained in the case. The film units after exposure are exited through an outlet slot. Two access openings are formed in the back wall of the case, and receive entry of pads of the camera. A light-shielding sheet is contained between the back wall and the film units, closes the access openings openably, and prevents ambient light from entry through the access openings. The light-shielding sheet, pressed by the pads, presses the film units toward the exposure aperture. Two pressing curved ridges are projected from the back wall in an arcuate shape, and contact at least two lateral edges which are formed beside the light-shielding sheet, and directed toward the outlet slot. The pressing curved ridges prevent the film units from being depressed to a rear of the exposure aperture inside the case.

43 Claims, 26 Drawing Sheets

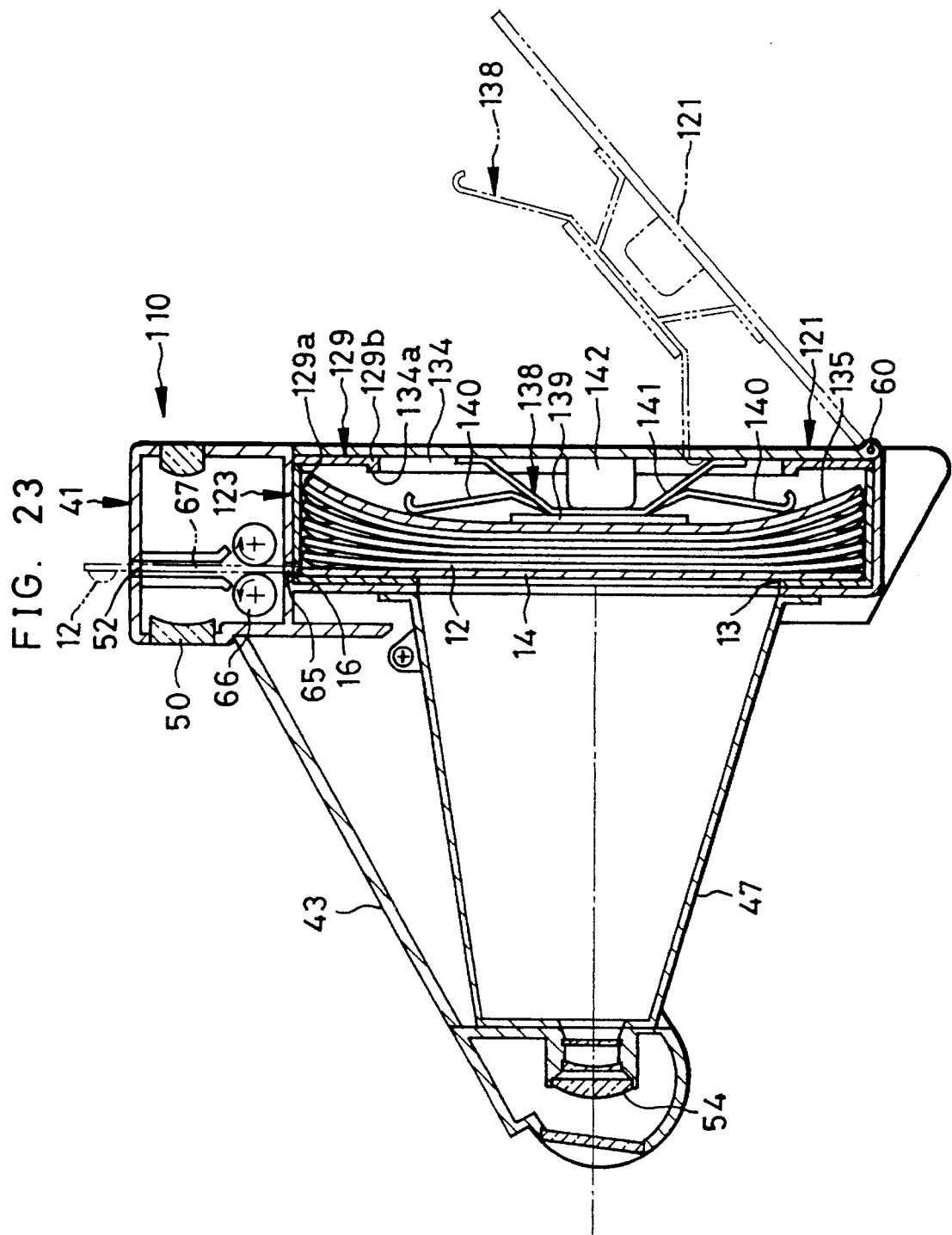

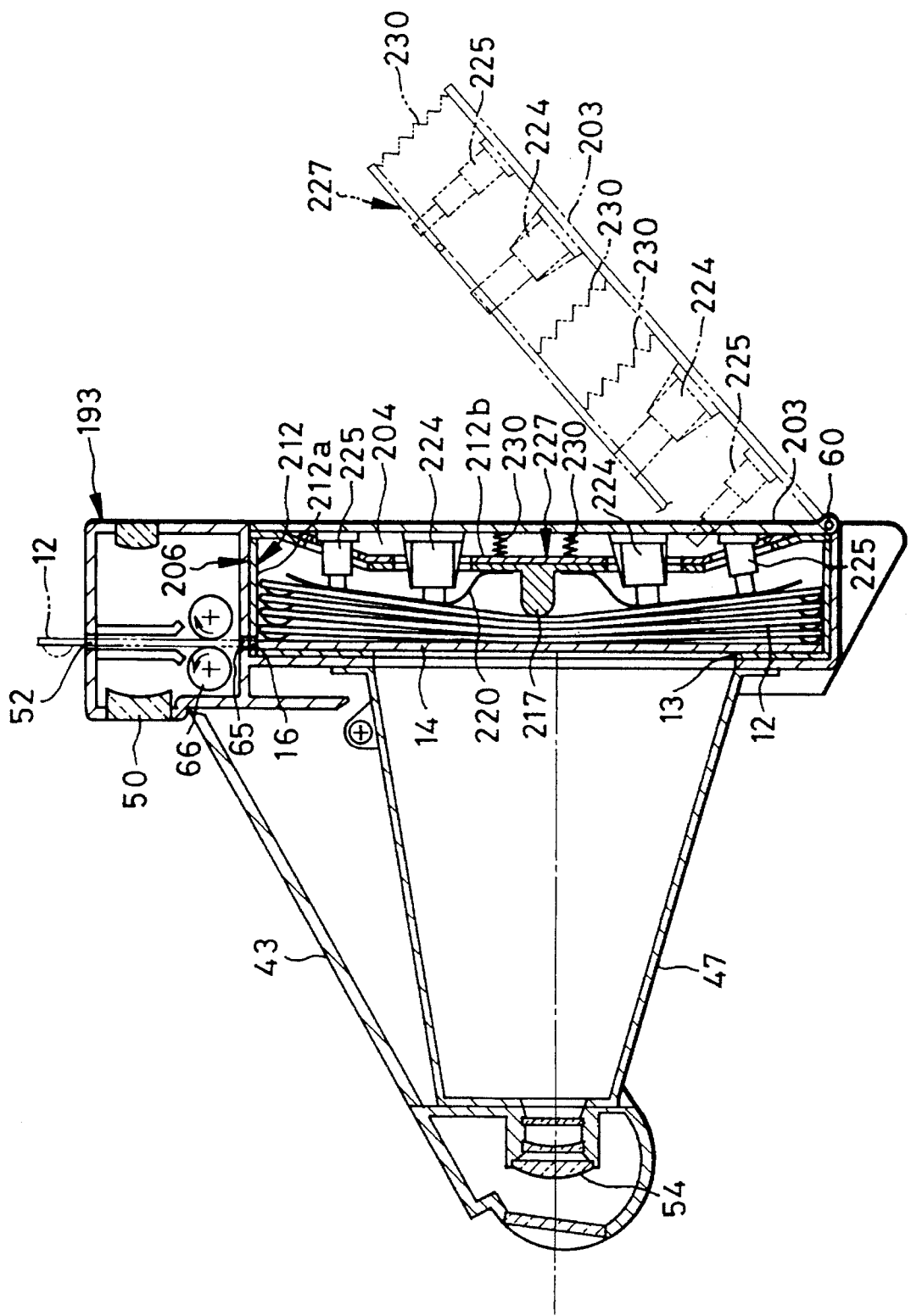

FIG. 36
(PRIOR ART)
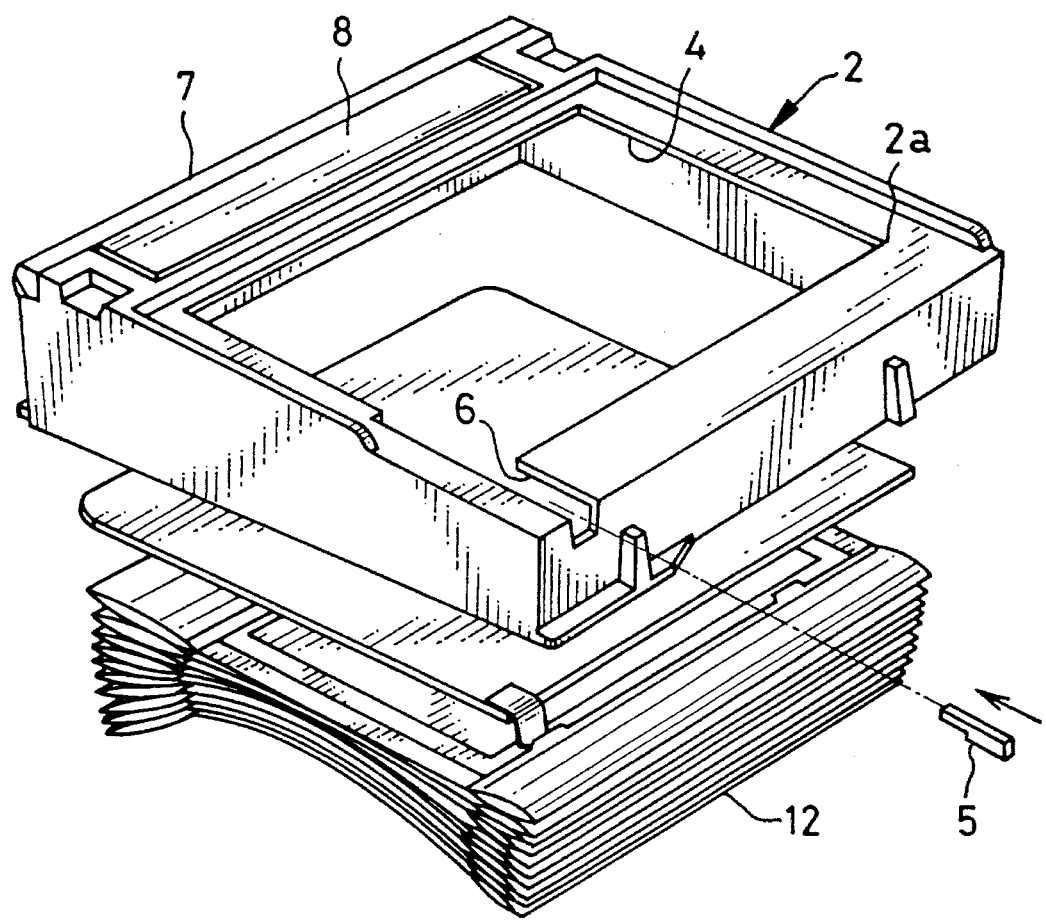
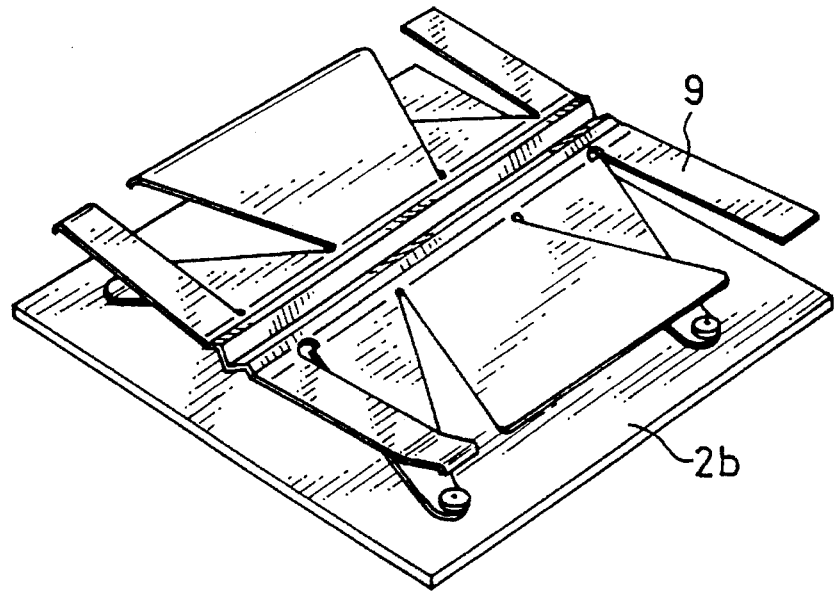

INSTANT FILM PACK AND INSTANT CAMERA

BACKGROUND OF THE INVENTION

1. Field of the Invention

The present invention relates to an instant film pack and an instant camera. More particularly, the present invention relates to an improvement of an instant film pack and an instant camera in which instant film units can be reliably protected from ambient light.

2. Description Related to the Prior Art

An instant camera is known as capable of producing a photograph as soon as it is taken, in fashion without complicated steps of photofinishing for ordinary photography. The instant camera has a film pack loading chamber, which is open to a rear of the camera and appears when a back lid is opened. The loading chamber is loaded with an instant film pack, of which a plastic case contains a number of film units of a self-processing type stacked together. On a back wall of the film pack is mounted a pressure plate constituted by a metallic plate spring, which presses a rear of the film units. When a photograph is taken, one of the film units is exited through an outlet slot in a top of the camera, by a claw mechanism incorporated in the camera for ejecting the film unit from the case. During the ejection, spreading rollers squeeze the film unit, press processing solution out of a solution pod, and spread it over a photosensitive image-recording portion of the film unit. A photographic image is gradually formed on the image-recording portion. In the film pack another film unit next to be exposed is pressed by the pressure plate and positioned directly behind the exposure aperture.

As illustrated in FIG. 36, the instant film pack has a plastic case 2 and film units 12. The case 2 consists of a casing frame 2a and a back wall 2b, and has an exposure aperture 4 formed in the casing frame 2a. The casing frame 2a has a cutout 6 which communicates the exposure aperture 4, and adapted to receiving a claw device 5 of the camera for ejecting the film units 12 after exposure. Through an outlet slot 7, the film units 12 are exited. A metallic clip 8 is fitted on a top of the casing frame 2a, and reinforces the outlet slot 7. A metallic pressure plate 9 is secured to the back wall 2b, and has a springy characteristic provided by plural slits and the finishing with bending. The springy characteristic of the pressure plate 9 presses the film units 12 toward the exposure aperture 4, for the purpose of flattening the film units 12. FIG. 37 illustrates another conventional film pack, including a case 232, a clip 236 and a pressure plate 237.

The instant film pack is contained in the instant camera. When all the film units of the film pack are exposed, the film pack is removed from the camera, and discarded as incombustible waste.

The film pack to be discarded, however, has both plastic parts including the case 2 and metallic parts including the pressure plate 9 and the clip 8. The disposal of the plastic and metallic parts as assembled is undesirable in view of protection of environment. To separate the metallic parts from the plastic parts requires destruction of the case. Accordingly the disposal or recycling of the parts are excessively costly, particularly for collectively withdrawn film packs treated in huge scale. The disposal and recycling of the film pack is completely inconsistent to the actually practiced mass production of the film packs. Another problem lies in the metallic pressure plate 9 which is costly to be manufactured and raises the cost of the film pack, in addition to rise in its weight.

JP-U 63-150954 illustrates an instant camera having a pressure plate, which is disposed on the back lid. A film pack has an access opening for receiving the pressure plate, and a resilient light-shielding sheet attached to the access opening for preventing ambient light from entering the film pack through the access opening. U.S. Pat. No. 4,823,155 illustrates a similar a pressure plate, which is disposed on the back lid, and has a characteristic of increasingly changing the height toward the film units with the decrease of the film units in the film pack, so as to press the foremost one of the film units against the exposure aperture.

The use of the film pack as disclosed in JP-U 63-150954 or U.S. Pat. No. 4,823,155 may eliminate the metallic pressure plate. However this brings another problem in failure in shielding light through the exposure aperture. When the unused film pack is inserted into the instant camera, a user's fingers are likely to touch a light-shielding cover disposed in front of the film units and behind the exposure aperture, and depress the film units toward the back lid. Peripheral gaps take place between the exposure aperture and the light-shielding sheet, and introduce ambient light into the case to fog the film units. There is a difference in thickness between the middle and the periphery of the film unit, because the solution pod is disposed on an edge close to the outlet slot, and a trap portion is disposed on an opposite edge for absorbing surplus solution. The middle of the film units is likely to be depressed, to fog the film units.

The pressure plate in the camera of JP-U 63-150954 or U.S. Pat. No. 4,823,155 is so small that only the middle of the film units in contact with the film units is reliably pressed against the exposure aperture. There is a problem in that pressure to peripheral portions of the film units is insufficient. The trap-side edge of the film units to be engaged with the claw device of the camera is likely to fail to engage. Thus the ejection of the film units is unstable. The pod-side edge is also involved with a problem in being received in the outlet slot.

If a similar pressure plate is enlarged to cover the trap-side edge and the pod-side edge of the film units, a camera will be given much greater weight. The solution pod may be accidentally ruptured by the enlarged pressure plate before exposure. The image-recording portion is likely to be given "pressure fogging". An access opening, which is formed in the film pack for receiving the pressure plate of the camera, is obliged to have an enlarged size, to pose a problem in capacity of the film pack in shielding the film units from ambient light.

The pressure plate disclosed in JP-U 63-150954 or U.S. Pat. No. 4,823,155 has another problem in that its portions are likely to engage accidentally with the film pack during the loading into the loading chamber, in addition to the poor appearance of the pressure plate when the back lid is opened.

SUMMARY OF THE INVENTION

In view of the foregoing problems, an object of the present invention is to provide an instant film pack and an instant camera in which the instant film units can be protected from ambient light in consideration of the local difference in their thickness, at the same time as flattening them on the exposure aperture.

Another object of the present invention is to provide an instant film pack and an instant camera in which the ejection of instant film units is stabilized.

Still another object of the present invention is to provide an instant film pack which can be designed in elimination of metallic parts.

In order to achieve the above and other objects and advantages of this invention, an instant film pack for use with an instant camera includes a case, having a back wall and a front wall in which an exposure aperture is formed. N rectangular film units are stacked and contained in the case. An outlet slot is formed in the case, for exiting the film units after exposure. At least one access opening is formed in the back wall of the case, for receiving entry of a pad device of the camera. A substantially rectangular flat light-shielding member is contained in the case and between the back wall and the film units, to close the access opening openably, for preventing ambient light from entering the case through the access opening. The light-shielding member is pressed by the pad device entered through the access opening, for pressing the film units toward the exposure aperture. A pressing projected portion is projected from at least a portion of the back wall in an arcuate shape, for contacting at least two lateral edges of the film units and/or the light-shielding member, the lateral edges directed toward the outlet slot. The pressing projected portion prevents the film units from being depressed to a rear of the exposure aperture inside the case.

In the present invention, the instant film units can be protected from ambient light in consideration of the local difference in their thickness. The foremost one of the film units can be flattened on the exposure aperture at the same time.

The instant camera for use with the instant film pack includes the pad device, which consists of plural pad mechanisms, disposed on the back lid, entered into the film pack through the access opening in closing of the back lid, for contacting the light-shielding member, to press the film units toward the exposure aperture.

In a preferred embodiment, the access opening comprises plural access openings arranged in the direction toward the outlet slot and away from one another. The light-shielding member is a resilient light-shielding sheet secured to the back wall fixedly in a position between the access openings. The pad mechanisms resiliently deform the light-shielding sheet, to press the light-shielding sheet against the film units. Accordingly, the film units can be stably ejected. The film pack which can be designed in elimination of metallic parts.

In a preferred instant camera, the light-shielding member is a resilient light-shielding sheet. The pad mechanisms include a middle pad mechanism, mounted in a middle of the back lid, for pressing a middle of the light-shielding sheet, and a peripheral pad mechanism, secured to the middle pad mechanism, for pressing a periphery of the light-shielding sheet.

In a preferred variant of film pack, the light-shielding member is a single rigid light-shielding plate and is pressed by the pad mechanisms in uniform fashion. The film pack further comprises a non-metallic pressing plate device, secured to the light-shielding plate, pressed against the film units by the pad mechanisms pressing the light-shielding plate, for pressing the film units against the exposure aperture.

BRIEF DESCRIPTION OF THE DRAWINGS

The above objects and advantages of the present invention will become more apparent from the following detailed description when read in connection with the accompanying drawings, in which:

FIG. 23 is a cross section illustrating still another preferred instant camera and instant film pack;

FIG. 32 is a cross section illustrating an additional preferred instant camera;

FIG. 36 is a perspective view illustrating a film pack of the prior art; and

DETAILED DESCRIPTION OF THE PREFERRED EMBODIMENT(S) OF THE PRESENT INVENTION

Figure 1:
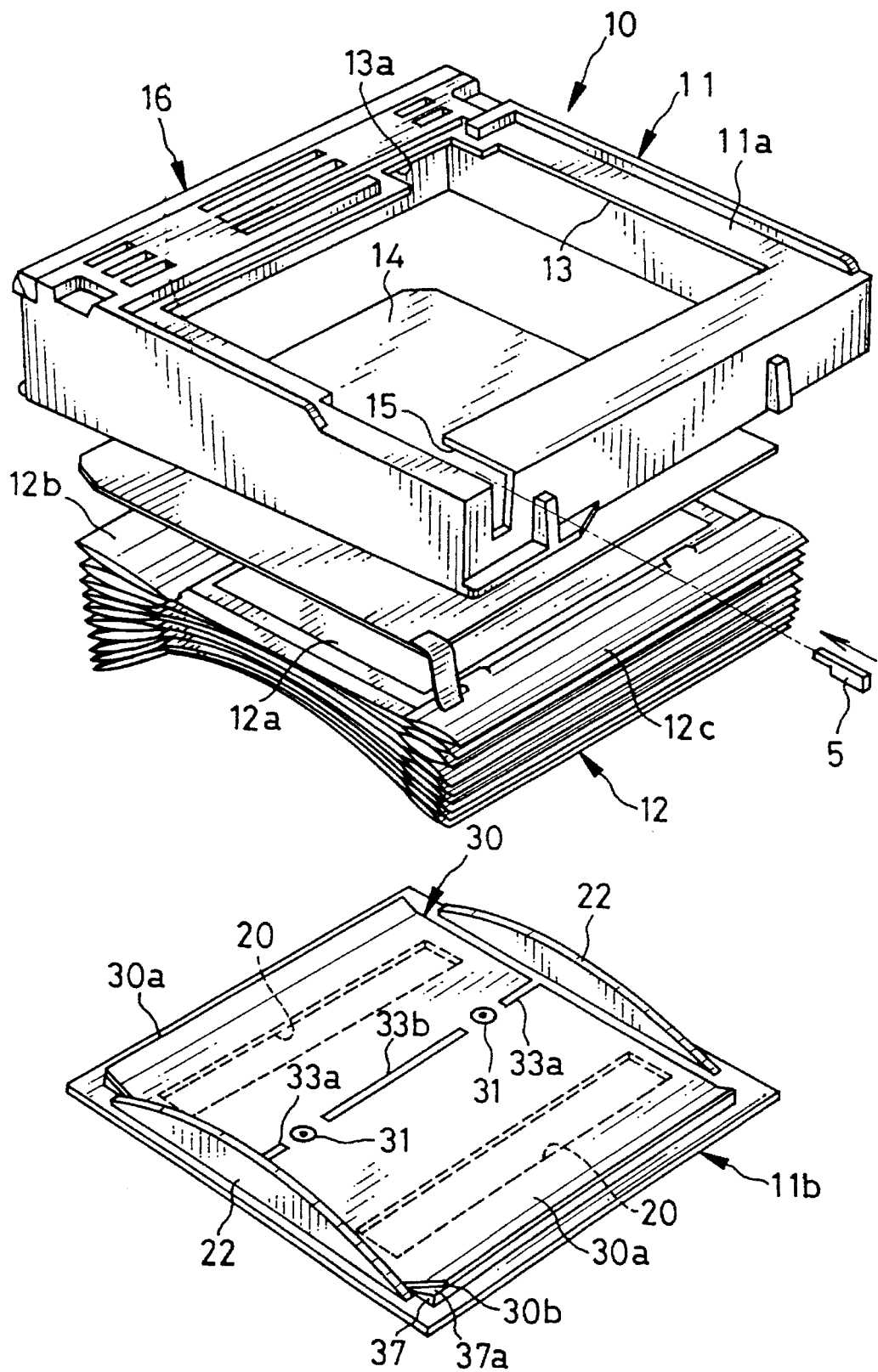
FIG. 1 is an exploded perspective view illustrating an instant film pack.

In FIG. 1, an instant film pack 10 consists of a rectangular case 11 formed of plastic material, and contains plural stacked film units 12. The case 11 consists of a casing frame 11a and a back wall 11b. The back wall 11b is attached to the casing frame 11a by adhesive agent, ultrasonic welding or the like after containing the film units 12 with light-shielding cover 14 and a light-shielding sheet 30, both of which are described later in detail. The film unit 12 is of a self-processing and mono-sheet type, and consists of an image-recording portion 12a having photosensitivity, a processing solution pod 12b containing developing solution, and a trap portion 12c for absorbing surplus solution remaining upon being spread. The pod 12b and the trap portion 12c has greater thickness than the image-recording portion 12a, so that the stack of the ten film units 12 is thinner at its middle and is thicker at its pod-side edge and trap-side edge.

A front wall of the casing frame 11a has an exposure aperture 13 which defines a range to be exposed on the film units 12. Before the film pack is used, the exposure aperture 13 is closed by the light-shielding cover 14, which is lapped over the first of the film units 12. There is formed an access cutout 15 to communicate with the exposure aperture 13, and to receive a claw device 5 well known in the art. An outlet slot 16 (See FIG. 5) is formed in a side of the casing frame 11a. The film units 12 after respective exposures are ejected through the outlet slot 16, through which the light-shielding cover 14 is also ejected upon depression of a shutter release button 49 immediately after the loading of the film pack. A rectangular cutout 13a is formed at a corner of the exposure aperture 13, for imprinting a date of photography. In a film pack loading chamber of an instant camera, a date imprinting device (not shown) is mounted in association with the cutout 13a. The date imprinting device records the date and/or time of photography to the film unit 12 upon being exposed.

Figure 2:
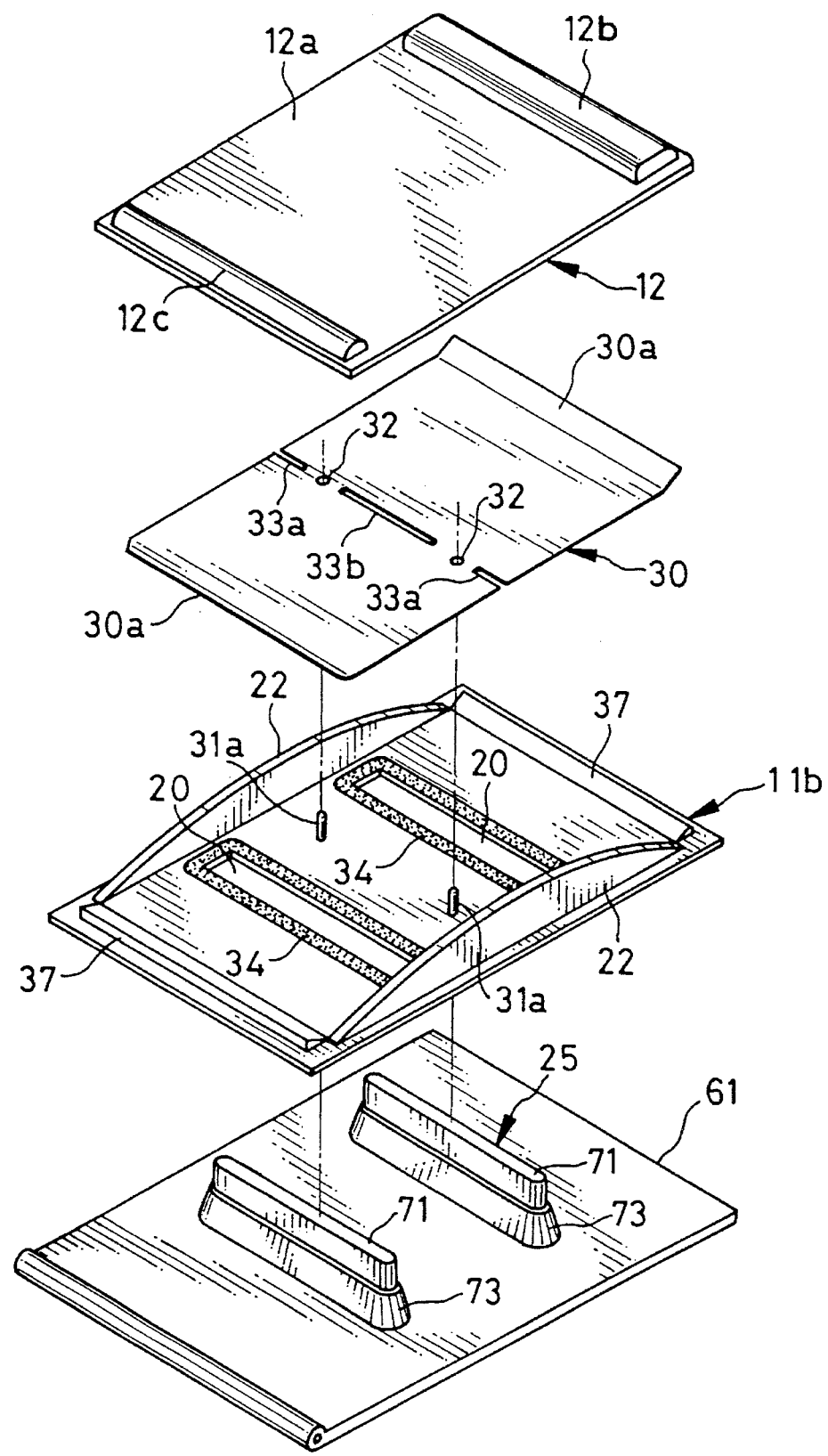
FIG. 2 is a perspective view illustrating film units, a light-shielding sheet, a back wall, and a back lid of an instant camera with compatibility.

As illustrated in FIG. 2, the back wall 11b has a pair of access openings 20 and a pair of pressing curved ridges 22. The access openings 20 are away from each other in the direction of movement of each film unit 12, and formed long in the direction vertical to this direction. The access openings 20 are formed for receiving pads 25 of a camera, which are constructed to press the film units 12 toward the exposure aperture 13. The access openings 20 are rectangular. However alternative access openings 20 can be shaped differently, e.g. in elliptical or circular form, or in rectangular form with rounded corners.

The two pressing curved ridges 22 are formed to project from the back wall 11b in direction perpendicular to the outlet slot 16. The height of the pressing curved ridges 22 decreases toward the pod-side edge and the trap-side edge from the middle, and in consideration of the different thicknesses of the image-recording portion 12a and the solution pod 12b or the trap portion 12c. When the ten film units 12, in the number defined by the standard of the film pack 10, are contained in the case 11, then the pressing curved ridges 22 contact and curve the tenth of them, to flatten the first of them on the exposure aperture 13 in tight contact. When the film pack 10 is manually held before being loaded, the light-shielding cover 14 is likely to be pressed by a user through the exposure aperture 13. The film units 12, however, are supported by the pressing curved ridges 22, and prevented from being sunken under exposure aperture 13, to avoid inadvertent exposure of the periphery of the film units 12 to ambient light.

As illustrated in FIG. 1, on the back wall 11b is placed the light-shielding sheet 30, which has a size slightly smaller than the film units 12. The light-shielding sheet 30 is secured to the back plate 11b at caulked portions 31 and between the pressing curved ridges 22. For the caulked portions 31, securing pins 31a are inserted through securing holes 32, and melted and caulked as the caulked portions 31. In the light-shielding sheet 30, slots 33a and 33b are formed along a straight line passing the caulked portions 31, and render the light-shielding sheet 30 easily flexible upon contact with the pads 25.

Adhesive agent is applied to the back wall 11b around the access openings 20 to form an adhesive layer 34, which causes the light-shielding sheet 30 to seal the access openings 20. The adhesive layer 34 consists of the adhesive agent of low adhesive power, such that light-shielding sheet 30 is peeled away from around the access openings 20 by the pads 25 of the camera. Note that the adhesive agent may be applied not only around the access openings 20 but also to caulked portions 31 at which the light-shielding sheet 30 is fixed on the back wall 11b (later to be described), and also to the whole inner face of the back wall 11b.

The light-shielding sheet 30 is formed of stiff and resilient plastic film, and have a thickness of 0.15 to 0.5 mm, preferably 0.2 to 0.4 mm. Examples of the plastic are polycarbonate and polyarylate of types in which little degradation occurs even after application of great mechanical load at high temperature, as such material is resistant to heat, deformation, use for a long duration, and has characteristic of recovering its original form even after application of the load.

Surfaces of the light-shielding sheet 30 preferably have high smoothness. Even when the pads 25 of the camera contact and press the light-shielding sheet 30, the pads 25 are kept capable of sliding vertically, as any horizontally directed component of the force from the sheet 30 is kept from application to the pads 25. Hence the pads 25 can have high durability.

Let $\mu 1$ be resistance to slip between the light-shielding sheet 30 and the film units 12. Let $\mu 2$ be resistance to slip between the film units 12. $\mu 1$ and $\mu 2$ are determined as $\mu 1 > \mu 2$. Accordingly the tenth of the film units 12 has greater resistance to slip with the light-shielding sheet 30 than with the ninth of the film units 12. The ninth film unit can be ejected in fashion separated from the tenth film unit, which remains with the light-shielding sheet 30. $\mu 1$ is given a sufficiently small value, so that the tenth film unit can be ejected while separated from the light-shielding sheet 30, and without disengagement from the claw device. This can reduce the load applied to the claw device. To give the slipping characteristic, the light-shielding sheet 30 may be finished to have grained surfaces or matte surfaces, or may have addition of lubricant agent.

The light-shielding sheet 30 includes bent portions 30a on its pod-side edge located on the solution pod 12b of the film units 12, and its trap-side edge located on their trap portion 12c. The bent portions 30a are V-shaped, are directed toward the exposure aperture 13, and have a width of 4 to 7 mm. The force of the light-shielding sheet 30 to recover its original form causes the bent portions 30a to press the solution pod 12b and the trap portion 12c toward the exposure aperture 13. The pod-side edge of each film unit 12 is reliably set inside the outlet slot 16, so that the film unit 12 can be ejected without fail. The trap-side edge of each film unit 12 is pressed against the access cutout 15 receiving the claw device, which can be reliably engaged with the film unit 12, also for the unfailing ejection.

Note that reference numeral 37 designates slant ridges having a receiving slant face 37a, on which the bent portions 30a are contacted before peeling of the light-shielding sheet 30, and which prevents the bent portion 30a from flattened with time in natural fashion. Note that each of the slant ridges 37 are continuous, but may be divided into two portions for supporting the same bent portions 30a. It is also possible to form plural straight projections without the slant face 37a, to support the distal edge of the bent portions 30a.

Figure 3:
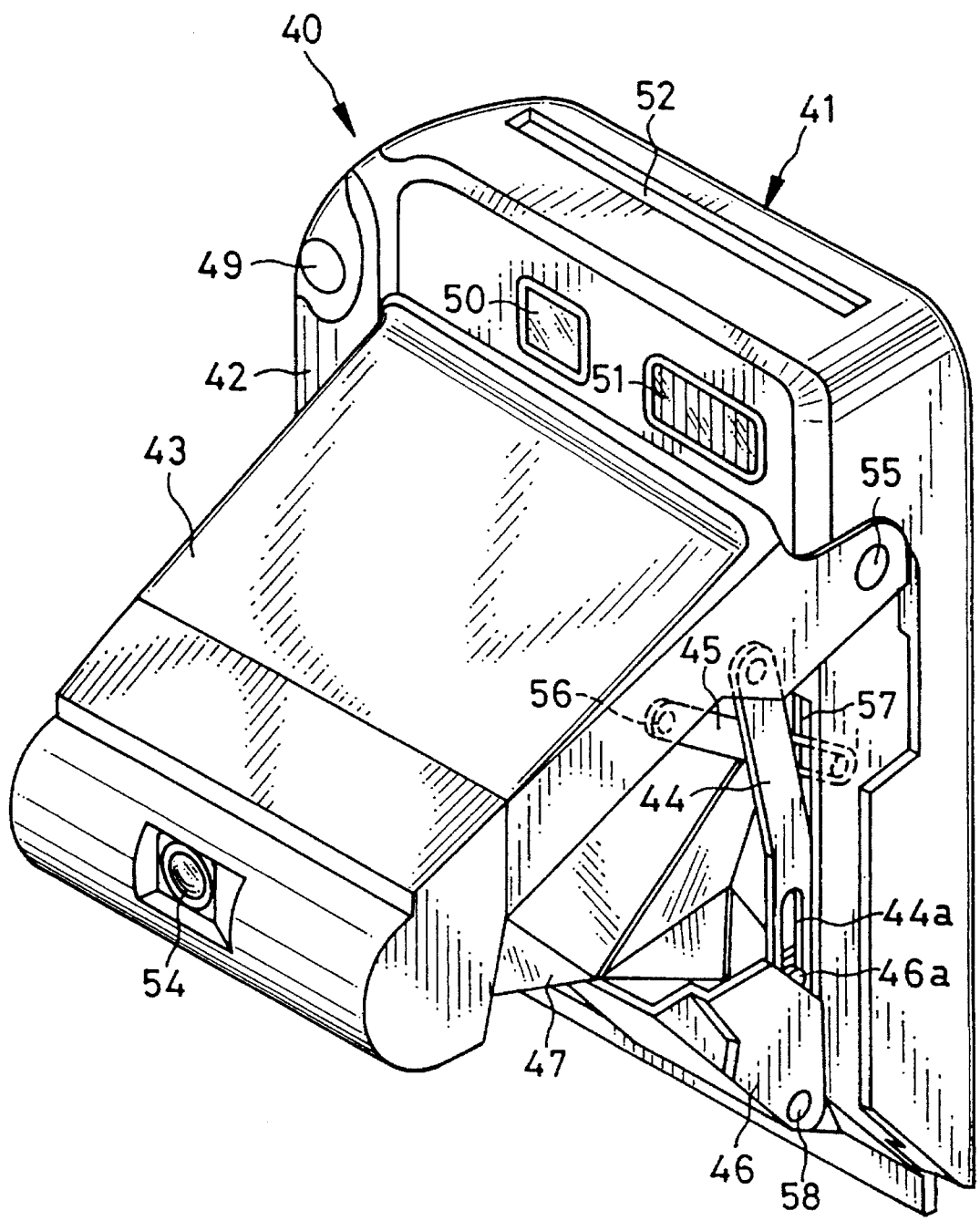
FIG. 3 is a perspective view illustrating the instant camera as unfolded.

An instant camera 40 for use with the film pack 10 is described. In FIG. 3 where the instant camera 40 is unfolded, the camera 40 includes a body 41, a grip 42, a lens board 43, a link 44, a stay 45 and a finger support 46. The body 41 has a general outline of a thin box. The grip 42 is integrated with the body 41. The lens board 43 is foldable toward the body 41. The link 44 and the stay 45 support the lens board 43. The finger support 46 is engaged with the link 44 and the body 41, and adapted to holding of a user's left hand. Bellows 47 is mounted between the body 41 and the lens board 43 to cover the photographic light path of the camera 40.

The grip 42 is provided with the shutter release button 49 for shutter releasing operation. The body 41 has a viewfinder 50 for observation of a photographic subject, and an electronic flash device 51. The top of the body 41 has an ejector slot 52 through which the film units 12 after photography are ejected.

Figure 4:
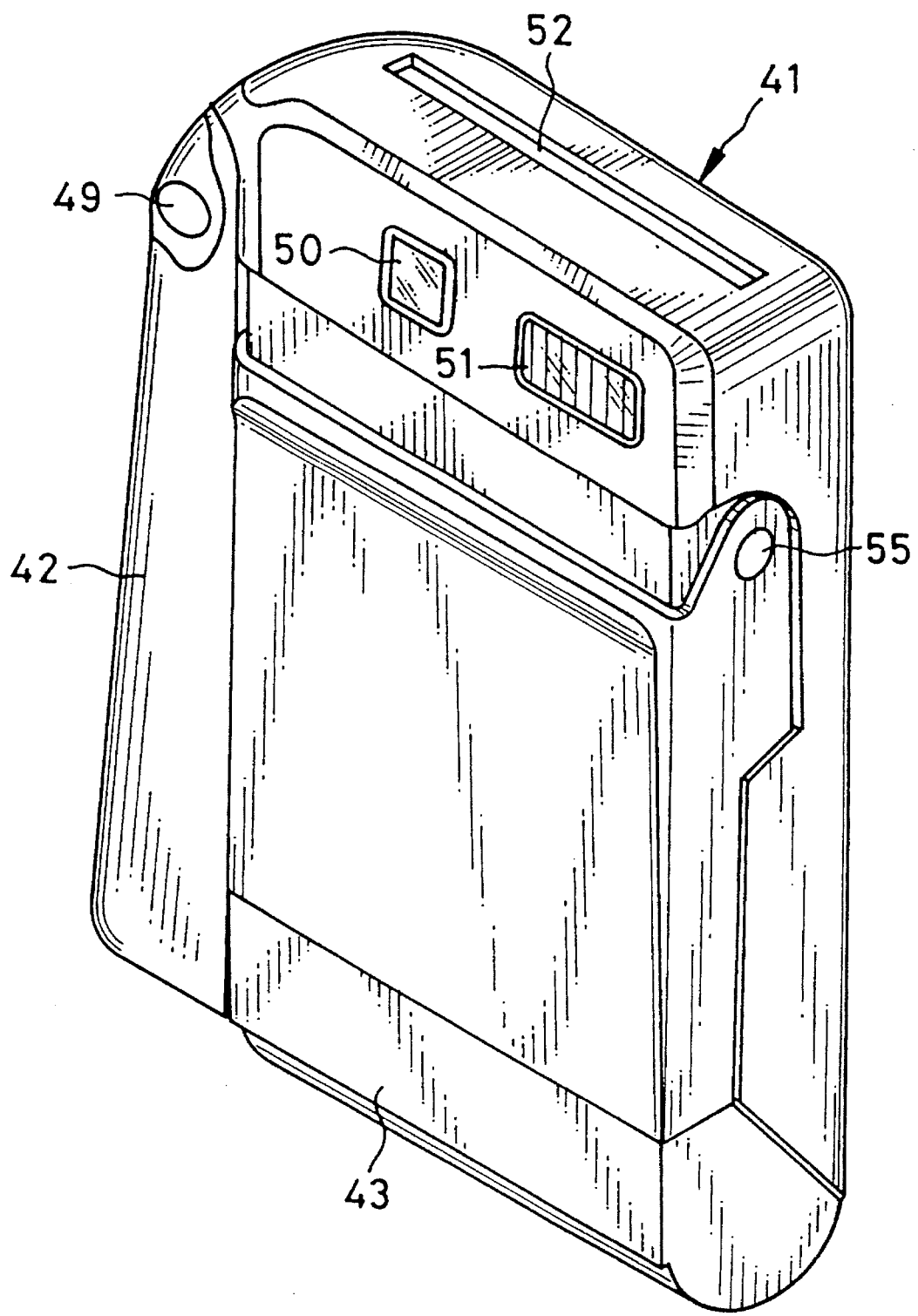
FIG. 4 is a perspective view illustrating the camera as collapsed.

The lens board 43 has a taking lens 54, a shutter device, a stop aperture mechanism, and the like. When the camera 40 is not used, the lens board 43 is folded by movement about a securing shaft 55 and on to the front of the body 41. The stay 45 is engaged with the lens board 43 and the body 41 to move with the folding lens board 43. When the camera 40 is not in use, the stay 45 is rotated relative to the lens board 43 about a securing shaft 56, and contained through a slot 57 into the body 41. The finger support 46 is rotatable about a securing shaft 58 on the body 41. A pin 46a is engaged in a slot 44a formed in the link 44. When the lens board 43 is folded, the finger support 46 is moved with the link 44 and contained between the lens board 43 and the body 41. Accordingly the camera 40 is collapsed as illustrated in FIG. 4 like a thin box having heightened portability.

As illustrated in FIG. 3, the bellows 47 is mounted to connect the lens board 43 and the body 41 in light-tight fashion. The bellows 47 is expandable, and folded upon folding the lens board 43 with the body 41 shielded from ambient light, to be contained between the body 41 and the lens board 43.

Figure 5:
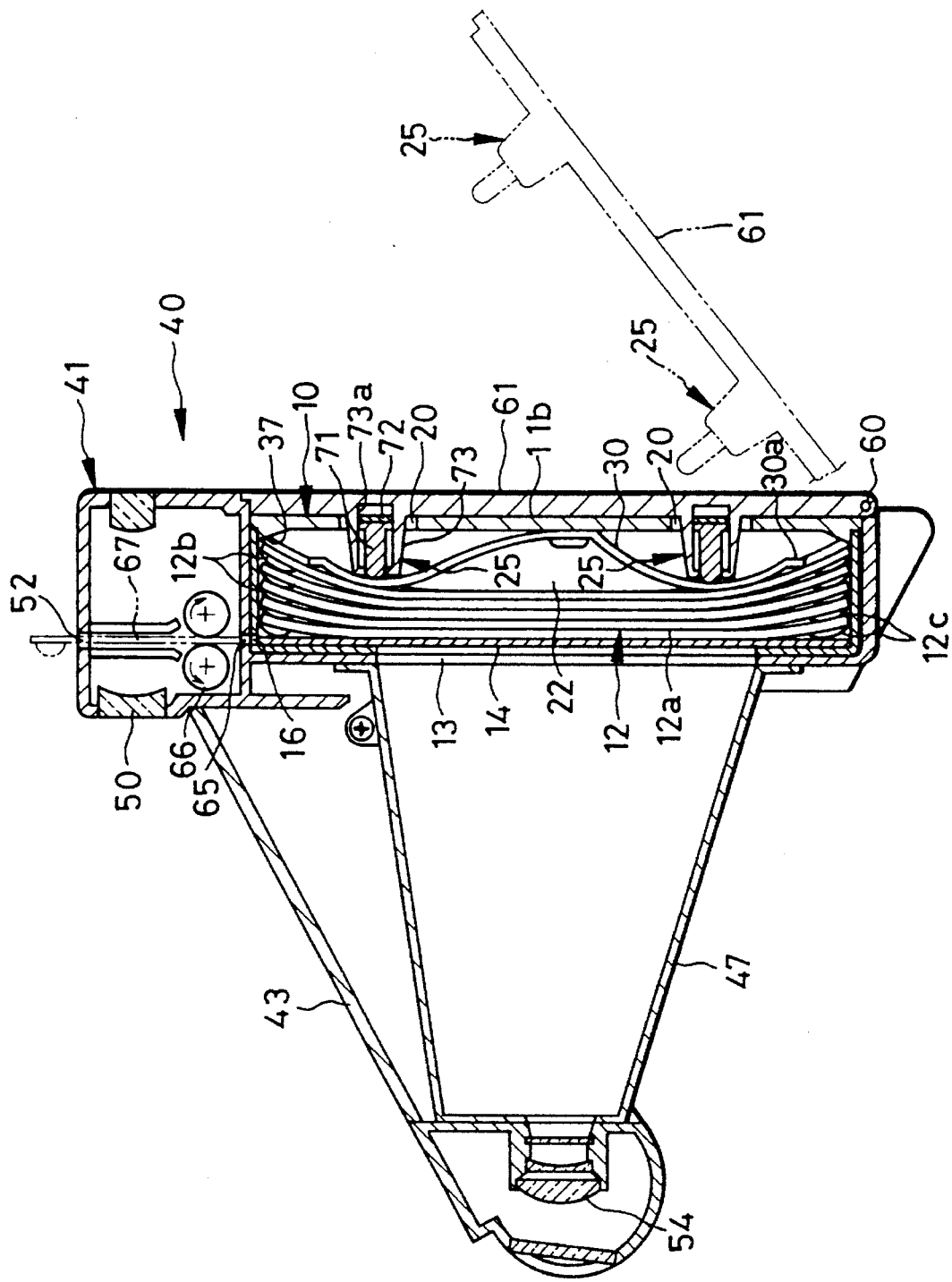
FIG. 5 is a cross section illustrating the instant camera and the film pack.
Figure 6:
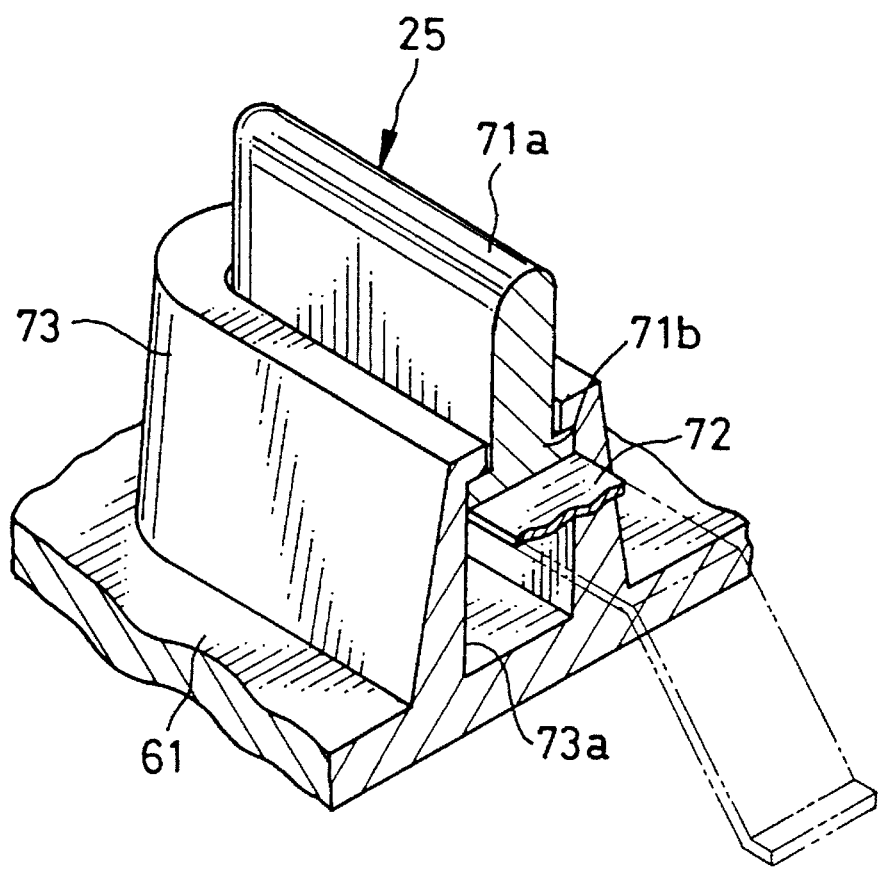
FIG. 6 is a perspective view, partly cutoff, illustrating each of the pads of the camera.

In FIG. 5 showing a section of the camera 40, a back lid 61 is connected to the rear of the body 41 via a hinge 60. When the back lid 61 is opened, a loading chamber appears, to be loaded with the film pack 10. The film pack 10 in FIG. 5 contains only the five film units 12, which are, however, depicted to have thickness exaggerated for the purpose of convenience in illustration. The actual film pack 10 contains the ten film units 12 as illustrated in FIG. 1.

The top inside the loading chamber has an ejecting port 65, through which the film units 12 from the film pack 10 are received and directed to the ejector slot 52. A pair of spreading rollers 66 are incorporated and disposed above the ejecting port 65. The spreading rollers 66 are rotated in the arrow directions. The film unit 12 after exposure is squeezed between, and advanced by, the spreading rollers 66. The solution pod 12b is ruptured. The processing solution pressed out of the solution pod 12b is spread with a uniform thickness between photosensitive and image-receiving sheets, during the passage between the spreading rollers 66. A film path 67 is formed over the spreading rollers 66. The film units 12 are passed through the film path 67 and ejected through the ejector slot 52.

The inner face of the back lid 61 has the pad 25 as illustrated in FIG. 5. The pad 25 consists of a pad head 71, a plate spring 72, and a holder 73 for supporting the block 71 and the spring 72. In FIG. 2, the holder 73 is projected from the back lid 61 and positioned to confront the access opening 20 in the film pack 10, and has a support hole 73a in which the pad head 71 and the plate spring 72 are supported. A top 71a of the pad head 71 is rounded to have an arcuate curve as viewed in cross section. A flange 71b avoids removal of the pad head 71 from the support hole 73a. The plate spring 72 biases the pad head 71 to heighten it on the holder 73. Note that a coil spring may be used instead of the plate spring 72 for biasing the pad head 71. The pad head 71 is movable between its uppermost and lowest positions. The pad head 71 in the uppermost position presses the tenth of the film units 12 against the exposure aperture 13 via the light-shielding sheet 30. The pad head 71 in the lowest position presses the light-shielding cover 14 against the exposure aperture 13 while sandwiching all the film units 12.

As illustrated in FIG. 5, the pads 25 are entered through the access openings 20 into the film pack 10, and press the light-shielding sheet 30. The light-shielding sheet 30 is partially separated from the back wall 11b, and presses the film units 12 against the exposure aperture 13. The resiliency of the light-shielding sheet 30 cooperates with the bias of the pads 25, and presses the solution pod 12b and the trap portion 12c against the exposure aperture 13. The trap portion 12c is reliably contacted with the claw device. The solution pod 12b is entered into the ejecting port 65.

The operation of the above constructed embodiment is described now. The back lid 61 of the instant camera 40 is opened as indicated by the phantom lines in FIG. 5. The film pack loading chamber is loaded with film pack 10. The instant camera 40, while not in use, is collapsed like a thin box in FIG. 4. To use the camera 40, the lens board 43 is unfolded, and supported by the link 44 and the stay 45, to have the used state in FIG. 3.

As illustrated in FIG. 5, the back lid 61 is closed after the loading of the film pack 10. The pads 25 are entered into the film pack 10 through the access openings 20 formed in the back wall 11b. The pad heads 71 into the film pack 10 are contacted on the light-shielding sheet 30, which is caused to press the film units 12 and the light-shielding cover 14 against the exposure aperture 13 in the casing frame 11a. The pod-side edge and the trap-side edge of the light-shielding cover 14 and the film units 12 are pressed by the bent portions 30a toward the exposure aperture 13.

After the loading of the film pack 10, the shutter button 49 is depressed to release the shutter device. Then the light-shielding cover 14 is ejected by the claw device, which is entered through the access cutout 15, abuts on the light-shielding cover 14, and presses it toward and through the outlet slot 16. The light-shielding cover 14 is passed through the ejecting port 65 in the loading chamber, and through the film path 67, and ejected from the ejector slot 52. Then the unexposed film unit 12 is set on the exposure aperture 13, and stands by for photography. Upon a releasing operation, the film unit 12 is exposed, and ejected in the similar manner.

Were it not for the slots 33a and 33b in the light-shielding sheet 30, the sheet 30 would be bent on the line passing through the caulked portions 31. When pressed by the pads 25, the light-shielding sheet 30 would react with the greater force to the pads 25. Accordingly the pads 25 should have had the greater biasing force. This would be unadvantageous as the back lid of the camera to be closed would require the greater force. In the present embodiment, the slots 33a and 33b are favorable as they reduce force received by the pads 25 from the sheet 30.

It is to be noted that, in the above embodiment, the pads 25 includes the plate springs 72. Alternatively variant pads may include a compression coil spring or torsion coil spring, for adaptation to a change in number of film units to be contained or a change in the pressing force of such pads. It is possible as desired to change the number of pads and access openings, in adaptation to a size and rigidity of film units to be contained. In the above, the access openings 20 are sealed light-tightly by the light-shielding sheet 30 in application of the adhesive agent having the low adhesive power. Alternatively the adhesive layer 34 in FIG. 2 may be eliminated. The access openings 20 can be blocked by the light-shielding sheet having high resiliency.

Figure 7:
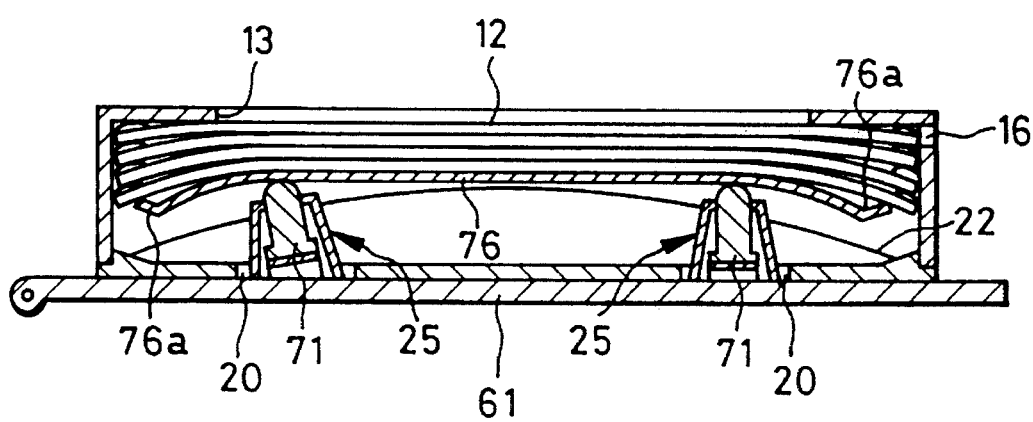
FIG. 7 is a cross section illustrating another preferred film pack with a back lid of a camera.

In the above embodiment, the securing pins 31a are melted as caulked portions 31 to secure the light-shielding sheet 30 on the back wall 11b. Alternatively, the securing pins 31a may be eliminated from a variant back wall. In FIG. 7, a light-shielding sheet 76 is mounted between the pressing curved ridges 22. Elements similar to those of the above embodiment are designated with identical reference numerals. The light-shielding sheet 76 has bent portions 76a, which press both pod-side edge and trap-side edge of the film units 12, to avoid failure in ejection of each film unit 12.

Figure 9:
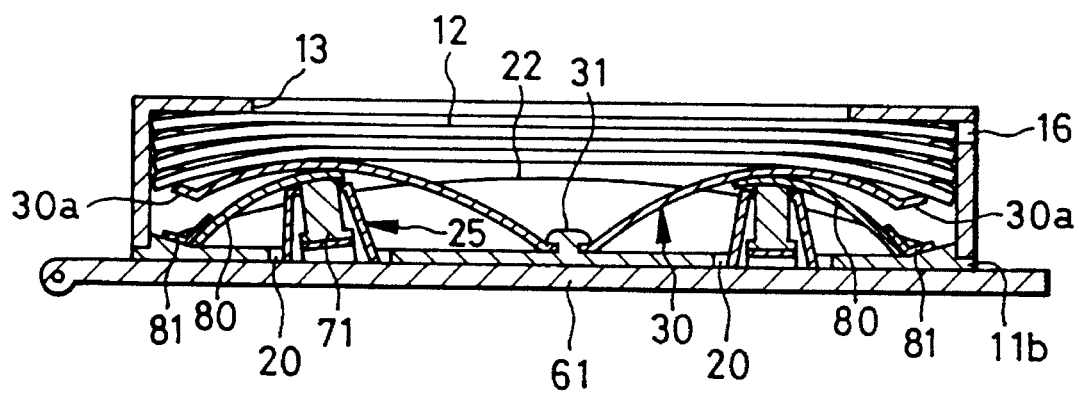
FIG. 9 is a cross section illustrating the film pack of FIG. 8 with a back lid of a camera.
Figure 8:
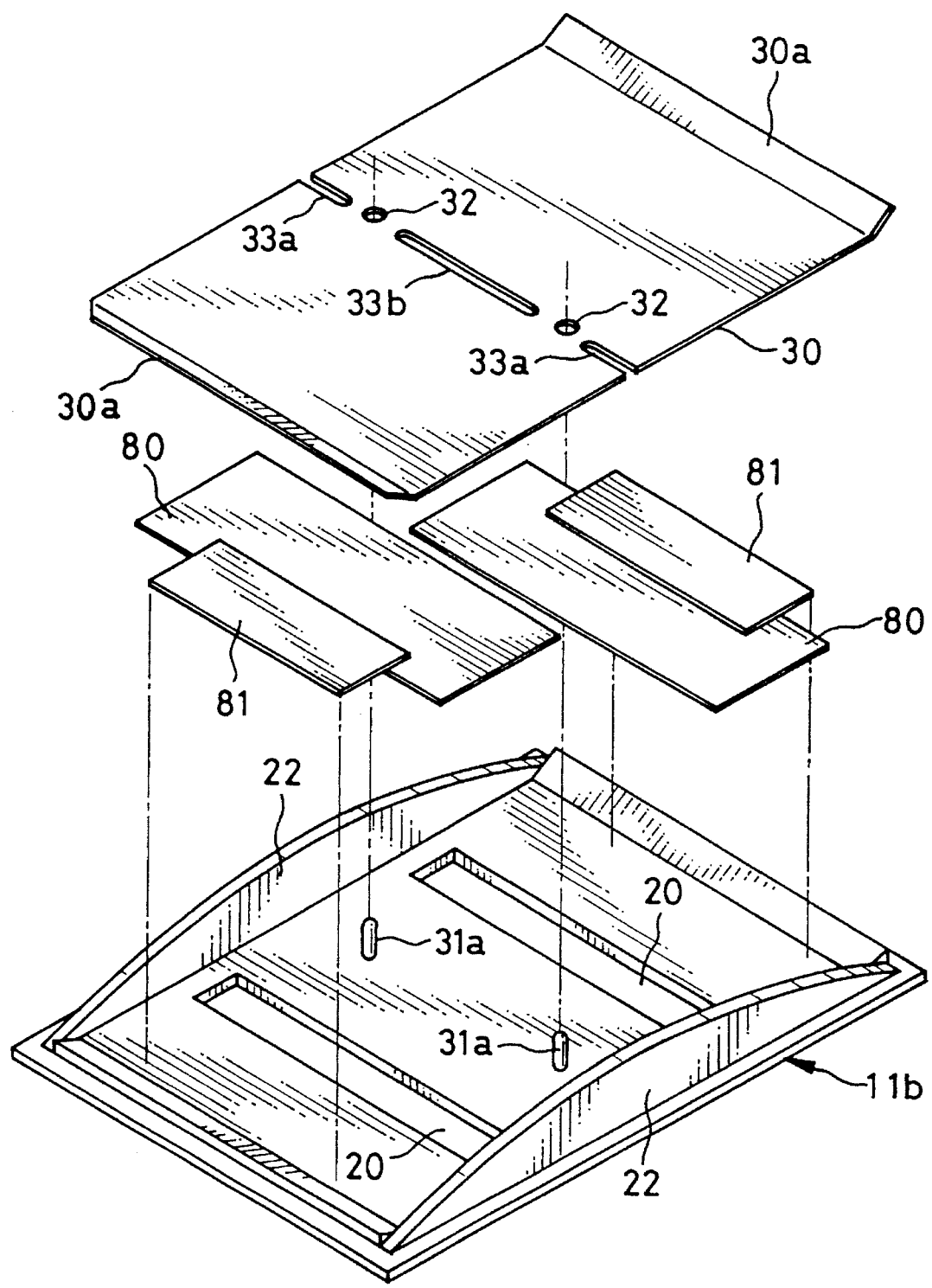
FIG. 8 is an exploded perspective view illustrating a further preferred film pack, which includes a light-shielding sheet, an auxiliary light-shielding sheets and a back wall.

Another preferred embodiment is described by referring to FIGS. 8 and 9. Auxiliary light-shielding sheets 80 are disposed between the light-shielding sheet 30 and the back wall 11b. Elements similar to those of the above embodiments are designated with identical reference numerals. The light-shielding sheets 80 are secured to the back wall 11b at their distal edges with adhesive tapes 81. The protrusion of the pad heads 71 opens the auxiliary sheets 80 about the adhesive tapes 81. Before complete closing of the back lid 61, the pad heads 71 enter the film pack 10. Even during the entry, the ambient light is kept from application to the film units 12 by cooperation of the light-shielding sheet 30, the auxiliary sheets 80 and the pressing curved ridges 22. Note that the auxiliary sheets 80 can be secured to the bottom lid 11b with caulking or adhesive agent, instead of the adhesive tapes.

Figure 10:
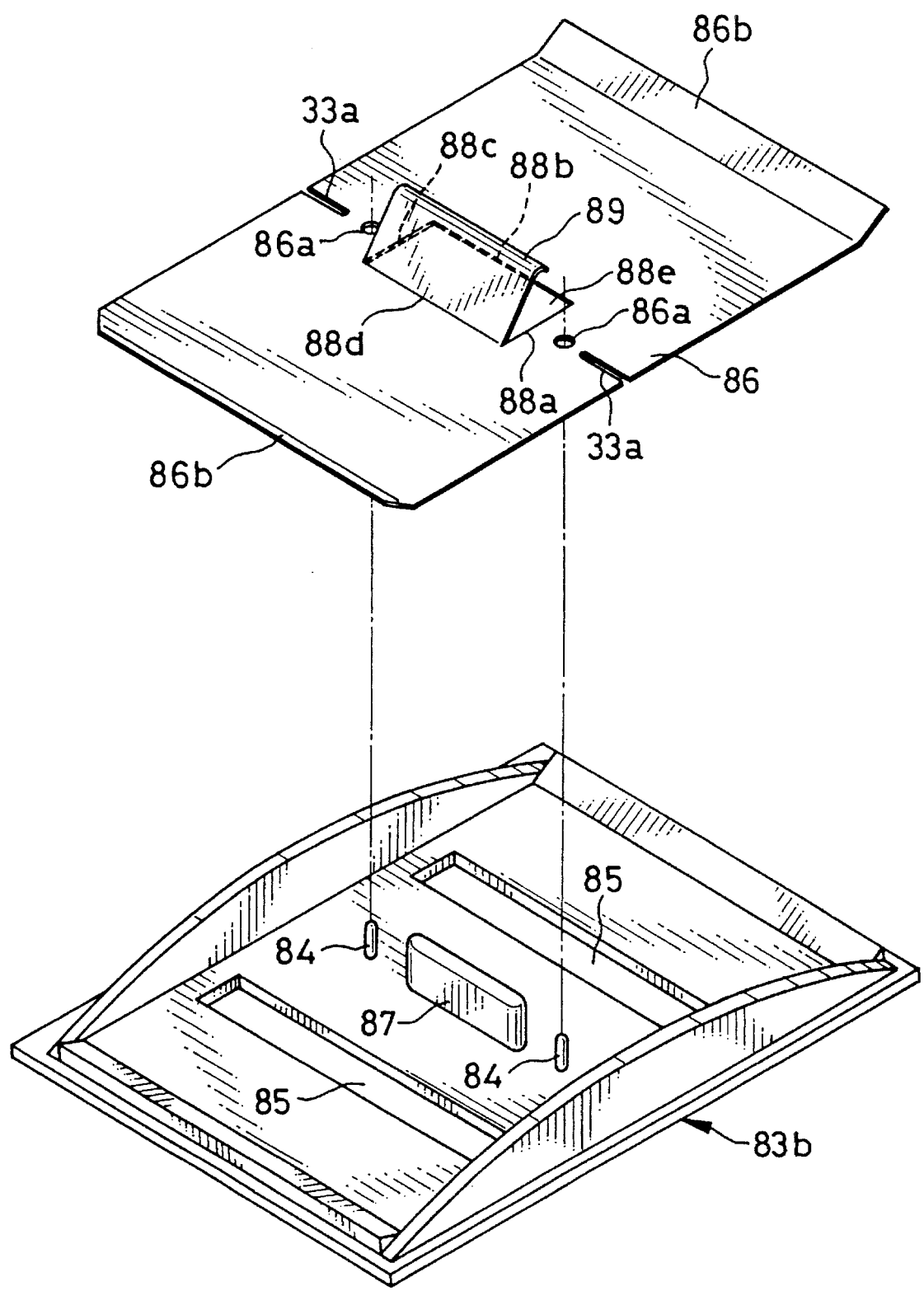
FIGS. 10 and 11 are an exploded perspective view and a cross section illustrating an additional preferred film pack, with a back lid of a camera.
Figure 11:
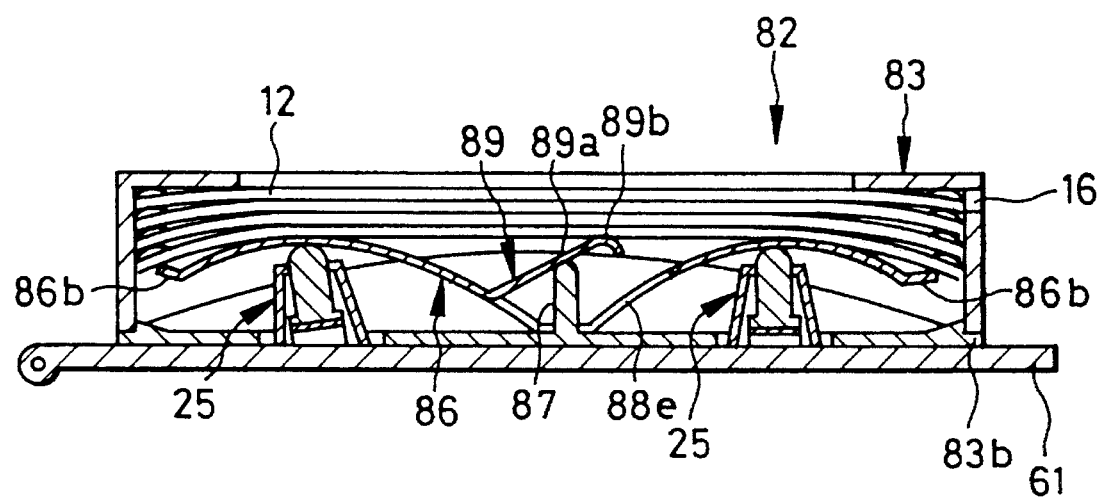

A further preferred embodiment is described now with reference to FIGS. 10 and 11. Elements similar to those of the former embodiments are designated with identical reference numerals. A film pack 82 has a case 83, of which a back wall 83b has two securing pins 84 and two rectangular access openings 85 on opposite sides with reference to the pins 84. A light-shielding sheet 86 having high resiliency is secured to the back wall 83b, and closes the access openings 85 light-tightly. The light-shielding sheet 86 has securing holes 86a, in which the securing pins 84 are inserted and melted as caulked portions, so as to secure the light-shielding sheet 86 to the back wall 83b fixedly. Adhesive agent (not shown) is applied to a periphery of the access openings 85, and seals the access openings 85 with the light-shielding sheet 86 with low power in the adhesion. Note that, in spite of this, it is possible to eliminate the adhesive agent and the sealing of the access openings 85.

As illustrated in FIG. 10, the middle of the bottom lid 83b is provided with a support ridge 87 projected toward the film units 12. In the middle of the light-shielding sheet 86 are formed three slits 88a, 88b and 88c and a bent side 88d, all of which define a pressing flap 89 inclined over the light-shielding sheet 86. In FIG. 11, the light-shielding sheet 86 is so secured to the back wall 83b that the support ridge 87 is inserted in an opening 88e defined by the pressing flap 89. A middle 89a of the pressing flap 89 is supported by the support ridge 87. A distal edge 89b is contacted on the rear middle of the film units 12. The middle of the film units 12 is pressed by the pressing flap 89 and the support ridge 87. The pod-side edge and the trap-side edge of the film units 12 are pressed by bent portions 86b against the film units 12, under the bias of the pads 25 in the same manner as the former embodiments.

Figure 13:
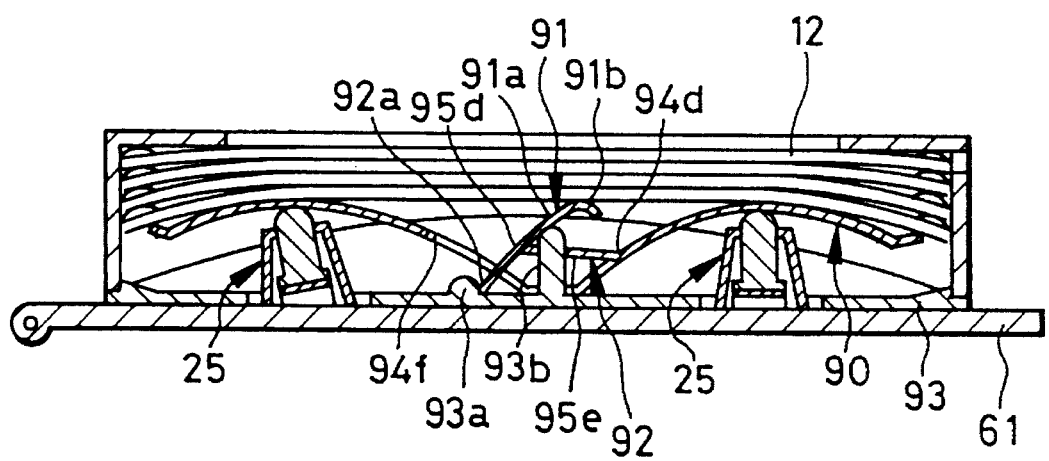
FIGS. 12 and 13 are exploded perspective view and a cross section illustrating still another preferred film pack, with a back lid of a camera.
Figure 12:
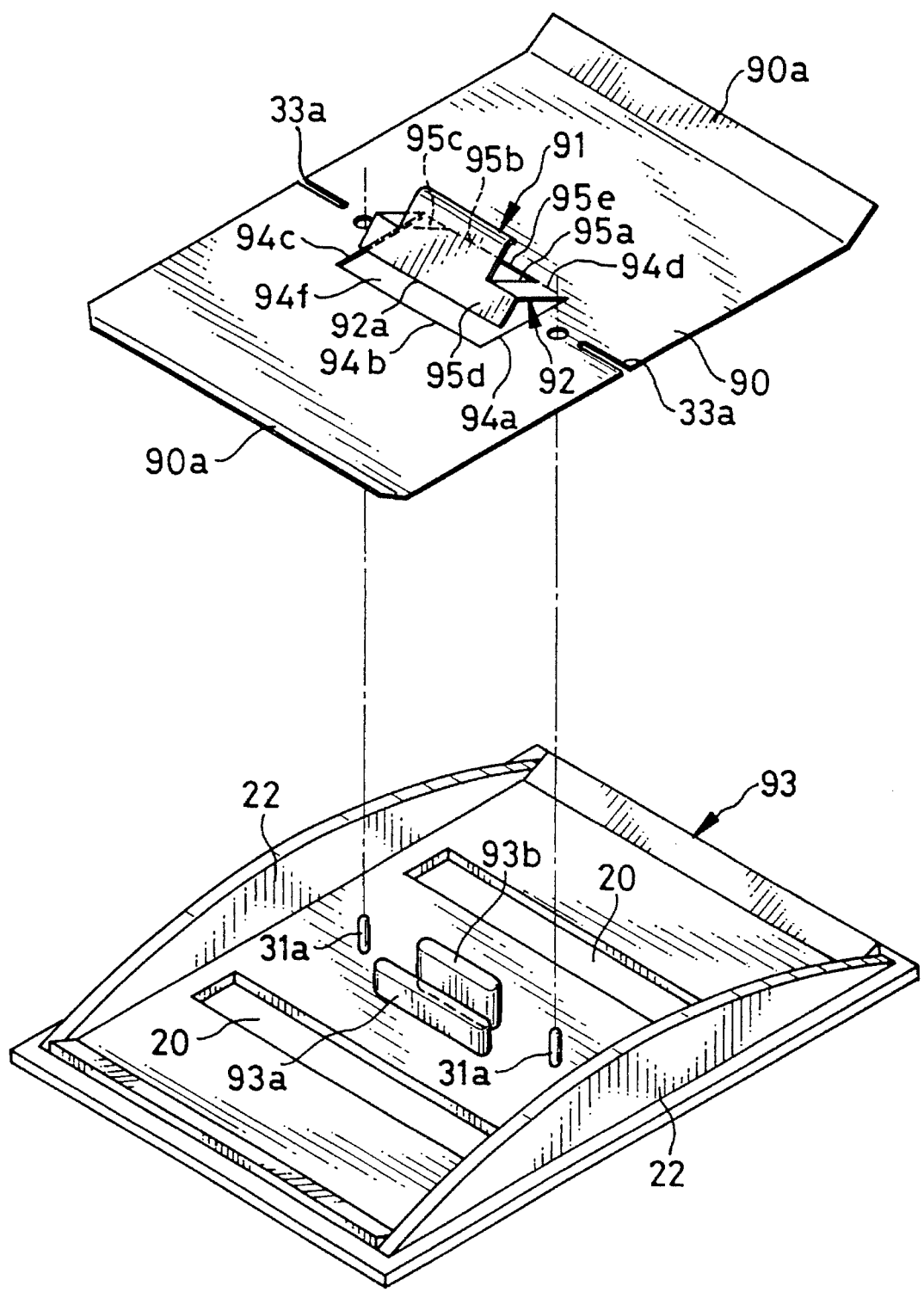

Still another preferred embodiment is referred to now with reference to FIGS. 12 and 13. Elements similar to those of the former embodiments are designated with identical reference numerals. In FIG. 12, a support flap 92 supports a pressing flap 91 of a light-shielding sheet 90. The pressing flap 91 presses the film units 12, but further with increased force for final ones of the film units 12. A retaining ridge 93a and a support ridge 93b are projected from a back wall 93. The support ridge 93b is higher than the retaining ridge 93a, and presses a middle portion 91a of the pressing flap 91. The retaining projection 93a has a width equal to the support flap 92, and retains a distal edge of the support flap 92.

In the middle of the light-shielding sheet 90 are formed three slits 94a, 94b and 94c and a bent side 94d, all of which define the support flap 92 inclined over the light-shielding sheet 90. In the support flap 92 are formed three slits 95a, 95b and 95c and a bent side 95d, all of which define the pressing flap 91.

As illustrated in FIG. 13, the light-shielding sheet 90 is secured to the back wall 93. The retaining ridge 93a is inserted in an opening 94f defined by forming the support flap 92. The support ridge 93b is inserted in an opening 95e defined by forming the pressing flap 91. A distal edge 92a of the support flap 92 is contacted on the retaining ridge 93a. The middle portion 91a of the pressing flap 91 is supported on the support ridge 93b. A distal edge 91b is contacted on the rear of the film units 12. The middle of the film units 12 is contacted by the support flap 92, the pressing flap 91 and the support ridge 93b. The pod-side edge and the trap-side edge of the film units 12 are pressed by bent portions 90a of the light-shielding sheet 90, together with the pads 25.

Figure 14:
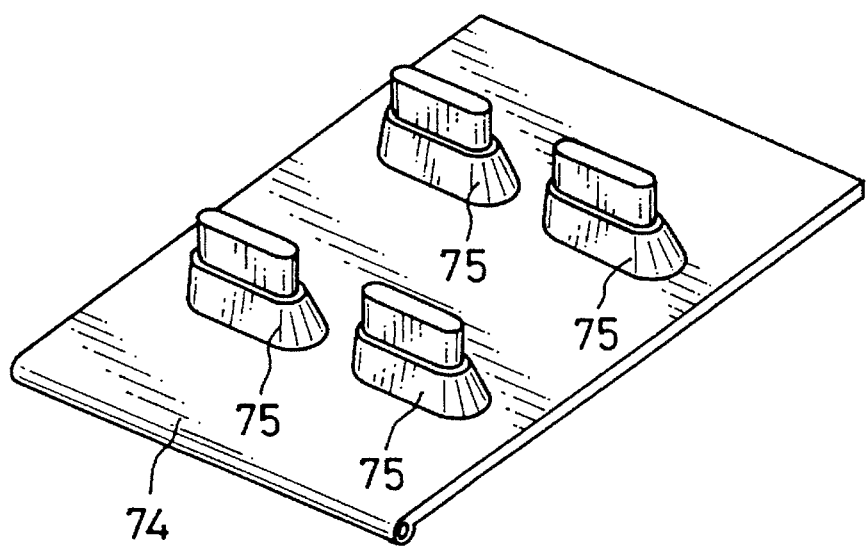
FIG. 14 is a perspective view illustrating other preferred pads of a camera.
Figure 6A:
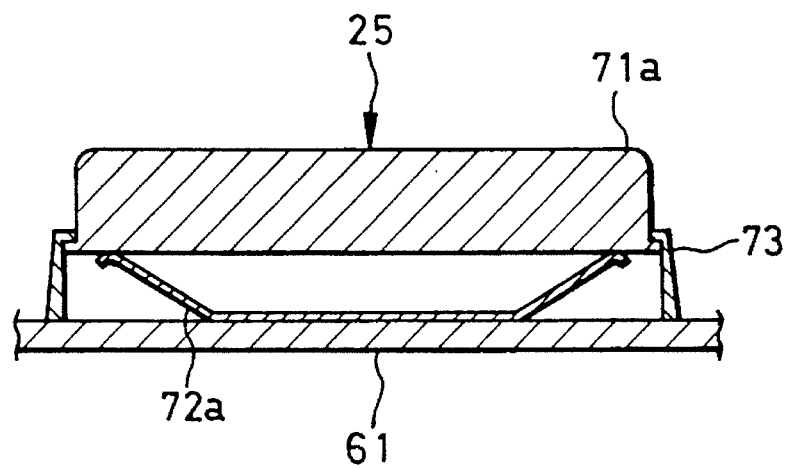
FIG. 6A is a cross section illustrating a variant pad.

In the above, the pads 25 lie to be vertical to the movement of the film units 12. Alternatively, four pads 75 can be disposed as illustrated in FIG. 14, in two lines and two rows on a back lid 74.

As described with reference to FIG. 36, the outlet slot 7 in the conventional film pack is provided with a metallic clip 8 fitted for the purpose of reinforcement. In view of consistency with the objects of the present invention to improve suitability for disposal of used film packs and for recycling, the clip 8 should be eliminated. However, simple elimination of the clip 8 from the film pack lowers the strength of the outlet slot 7. When the film unit is being ejected from the film pack, an outlet slot 100 is likely to be deformed by the film unit passing the outlet slot 100. The deformation with a curve at the outlet slot 100 lowers the quality of the instant photograph, as the deformation makes it difficult to flatten the film unit 12 during the ejection. It is also likely that the ejection of the film unit 12 is unstable, and that the spreading of the solution is unstable as the outlet slot is deviated from a path directed to the spreading rollers.

Figure 15:
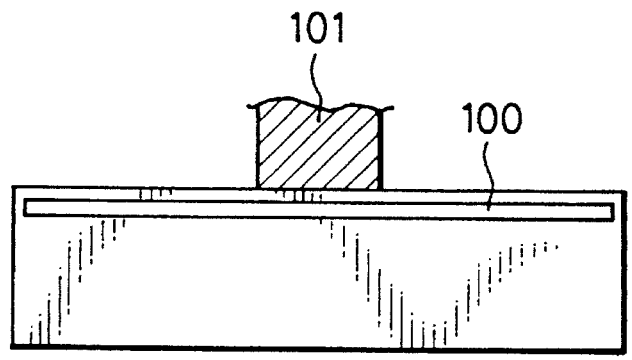
FIG. 15 is a front elevation illustrating a projection for preventing an outlet slot from being spread.
Figure 16:
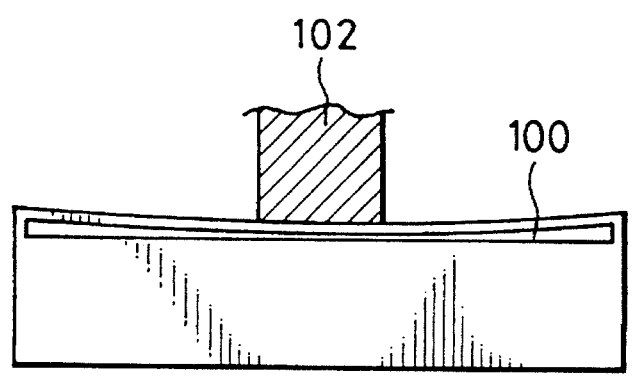
FIG. 16 is a front elevation illustrating a variant projection for prevention of the spreading.
Figure 17:
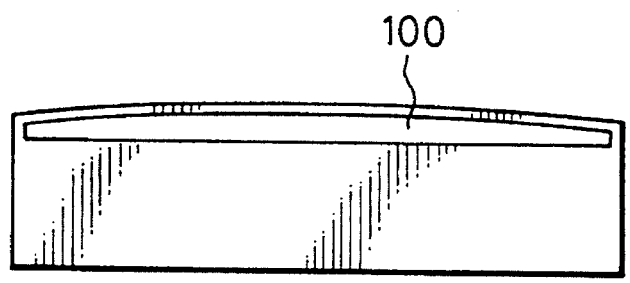
FIG. 17 is an explanatory view in elevation illustrating the outlet slot without combination of the projections of FIG. 15 and 16.

To solve such a problem, an instant camera can have a loading chamber in which a projection 101 can be formed to contact a film pack at the outside of the outlet slot 100 for avoiding deformation of the outlet slot 100, as illustrated in FIG. 15. Further a variant projection 102, in FIG. 16, can have a greater height for narrowing the outlet slot 100. This is favorable in spreading the processing solution in a reliably uniform manner, as the processing solution in a conventional instant camera would be likely to be insufficient in lateral areas and excessive in a central area. Note that those projections 101 and 102 are flat, but may be provided with a gently curved face.

Figure 18:
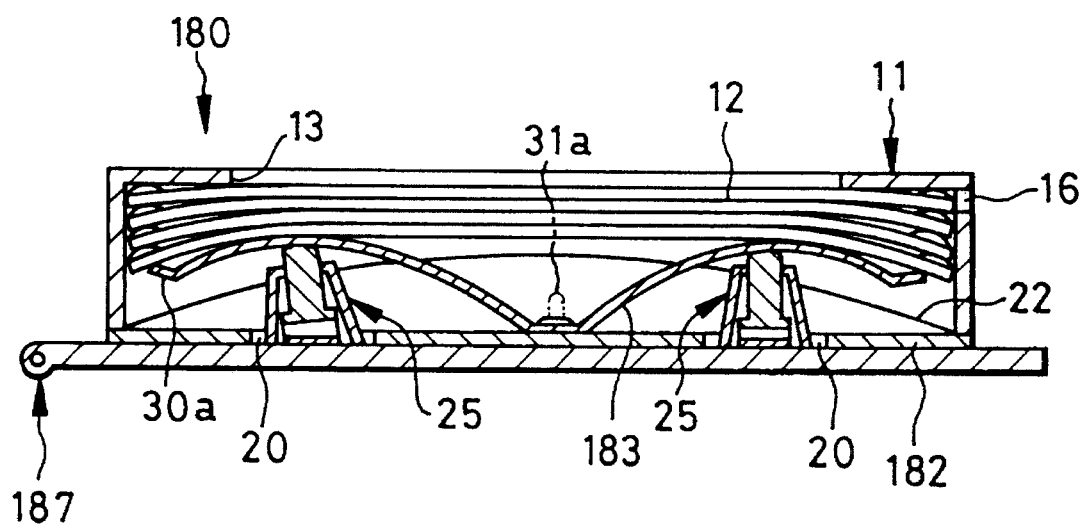
FIGS. 18 and 19 are a cross section and an exploded perspective view illustrating still another preferred film pack.
Figure 19:
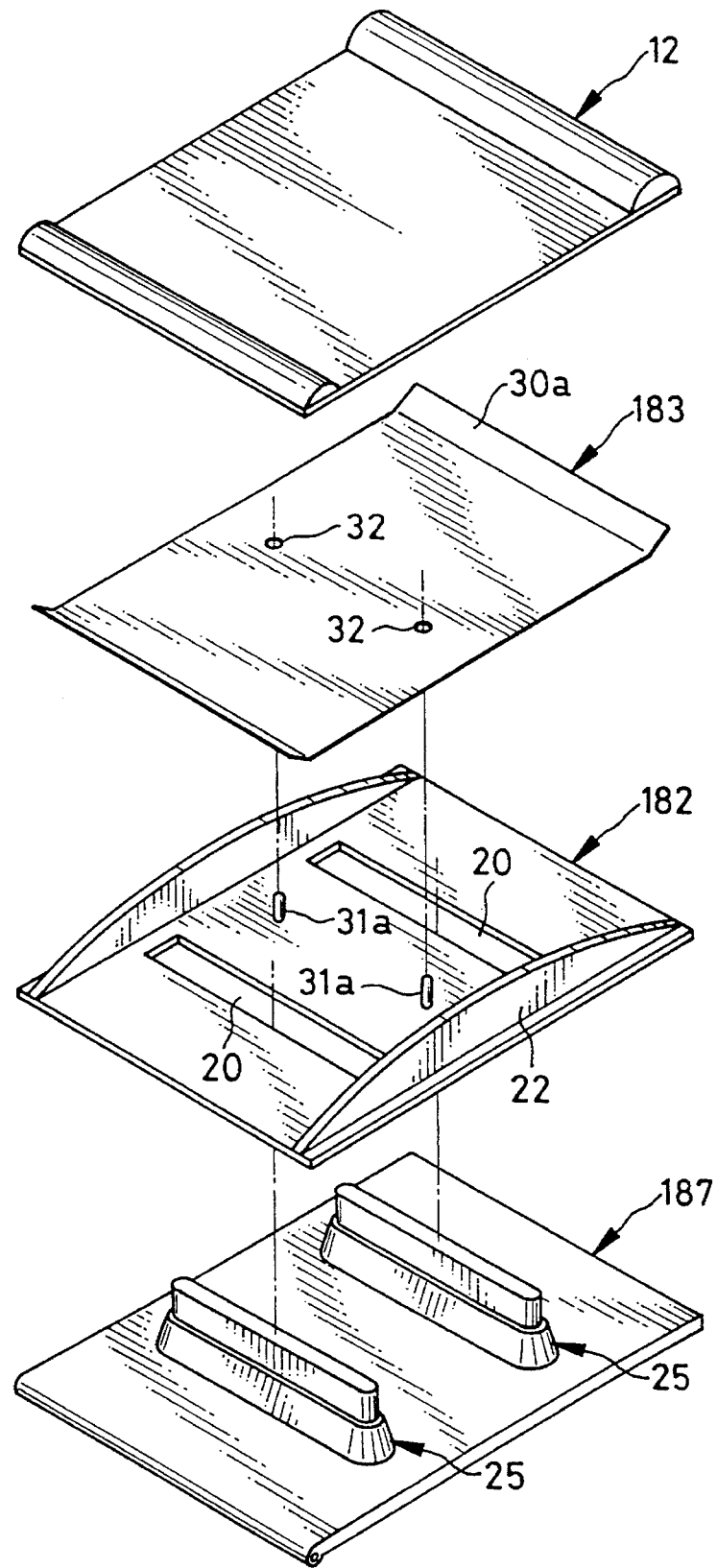

The present invention is also applicable to a film pack 180 depicted in FIGS. 18 and 19, in which the above-described slant ridges 37 are eliminated from a back wall 182 of the film pack 180, and the slots 33a and 33b are eliminated from a light-shielding sheet 183. Elements similar to those of the above embodiments are designated with identical reference numeral. 187 designates a back lid of a camera.

Figure 20:
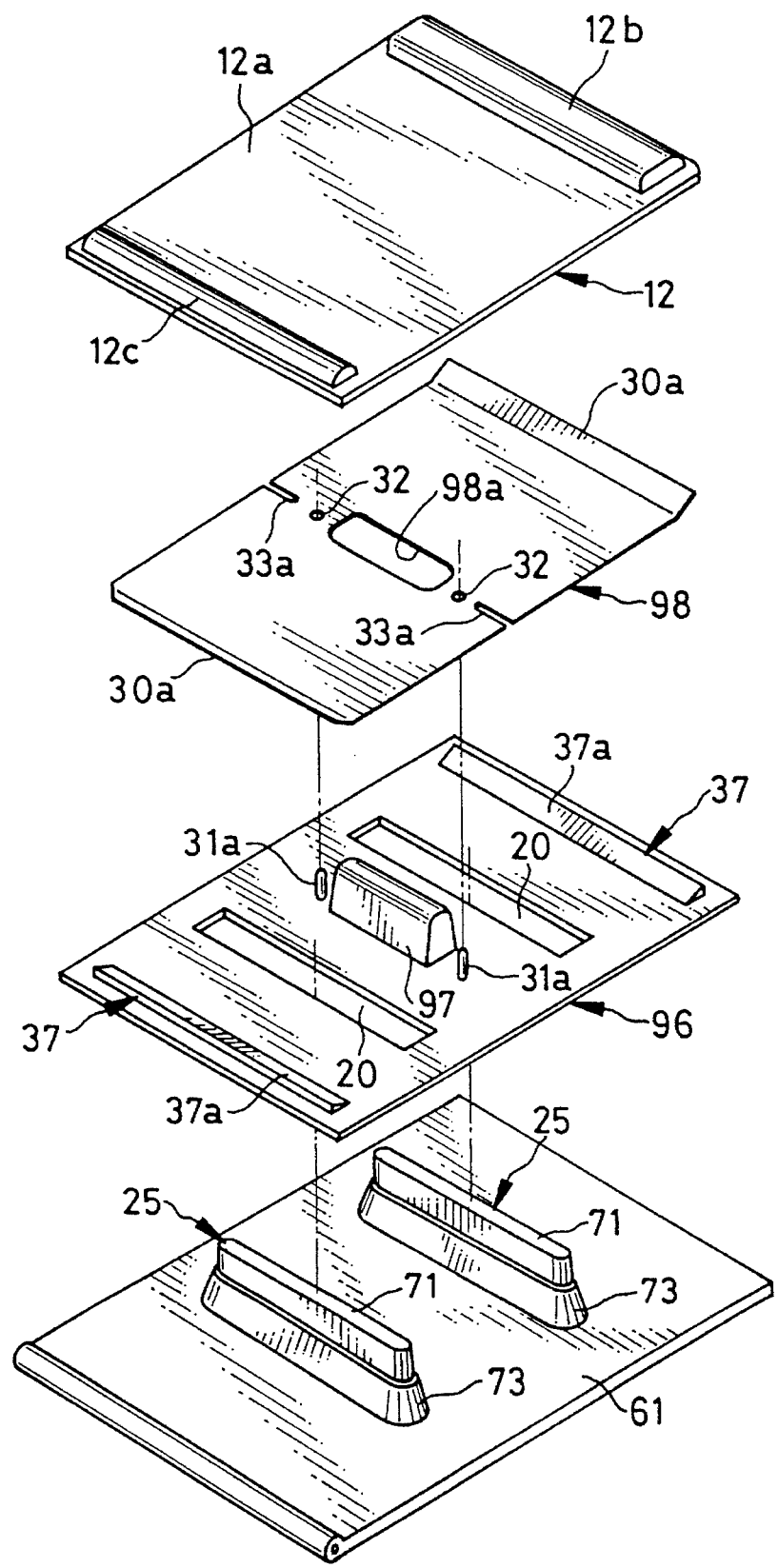
FIG. 20 is a perspective view illustrating a further preferred film pack, which includes film units, a light-shielding sheet, and a back wall, and is depicted with a back lid of an instant camera.

The present invention is still applicable to a film pack in FIG. 20, in which the pressing curved ridges 22 are eliminated from a back wall 96. Elements similar to those of the former embodiments are designated with identical reference numerals. 98 designates a through opening, in which a support ridge 97 is inserted for supporting the center of the film units 12. Note that a similar support ridge or block, as not shown, may be disposed on a back lid of a camera. For use with such a camera, a variant film pack may have a back wall with a through opening for access of the support ridge. The through opening can be closed by simple contact with a light-shielding sheet, but also can be sealed in cooperation of adhesive agent of low adhesive power.

In the above embodiments, the case 11 consists of the casing frame 11a having the front wall and the back wall 11b. Alternatively a case may consist of a casing frame having a back wall and a front wall fitted on the casing frame. The back wall, of course, has the access openings, while the front wall has the exposure aperture.

In the above, the slots 33a and 33b are formed in the light-shielding sheet 30. Instead, slits formed without width, or linearly thinned portions with reduced thickness, can be formed on a light-shielding sheet, for the purpose of reliable flexibility at the center of the light-shielding sheet. In the above, the single light-shielding sheet 30 is used. Alternatively two pieces of light-shielding sheets may be used, and can be secured by the caulking. The bent portions 30a, 86a and 90a are formed on each light-shielding sheet in the above, but may be eliminated from a flat light-shielding sheet.

Note that the pressing curved ridges 22 can have a projected shape for providing the film units 12 with irrecoverably curved tendency like a curl with time. After the film units 12 have obtained the curved tendency, the bent portions 30a of the light-shielding sheet 30 press the edges of the film units 12 toward the exposure aperture 13. The curved tendency of the sheet 30 responds to the pushing of the bent portions 30a, and biases the middle of the sheet 30 toward the exposure aperture 13. Therefore the image-recording portion 12a is reliably flattened.

Figure 21A:
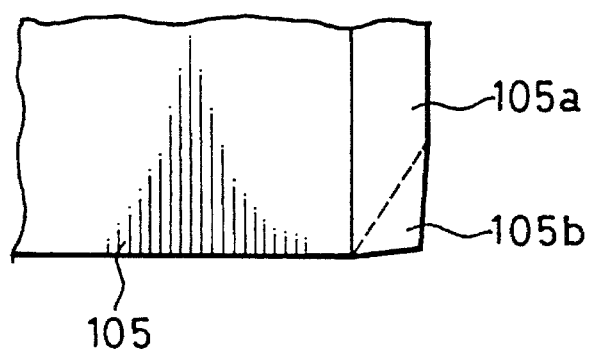
FIG. 21A is a partial plan view illustrating another preferred light-shielding sheet.
Figure 21B:
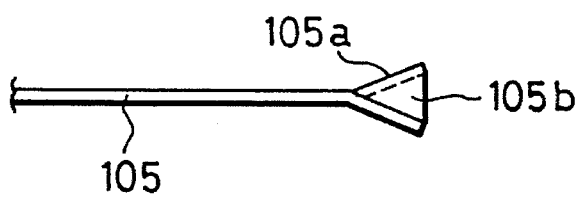
FIG. 21B is a partial front elevation illustrating the sheet of FIG. 21A.
Figure 22A:
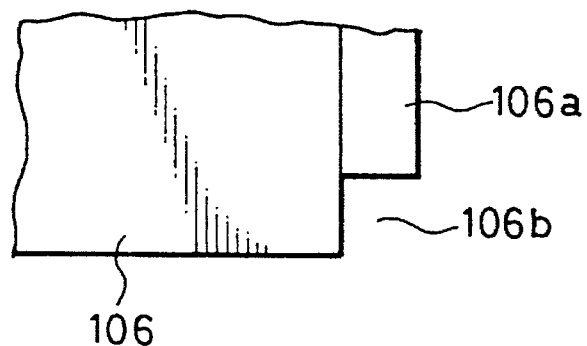
FIGS. 22A and 22B are a partial plan view and a partial front elevation illustrating still another preferred light-shielding sheet.
Figure 22B:
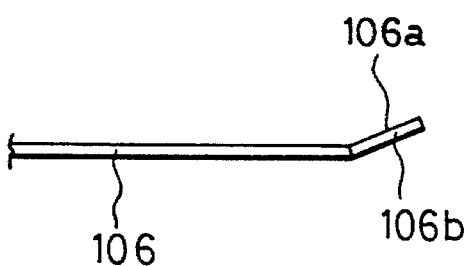

In the above embodiment in FIG. 1, a corner of the light-shielding sheet 30 has a corner cutout 30b, which corresponds to the access cutout 15 for the claw device. The cutout 30b prevents the claw device from engagement with the light-shielding sheet 30 while the tenth of the film units 12 is ejected. Alternatively, a variant light-shielding sheet 105 can have a bent corner 105b for preventing interference, which is slant toward the back wall at an end of a bent portion 105a, as illustrated in FIGS. 21A and 21B. Further a light-shielding sheet 106, in FIGS. 22A and 22B, can have a corner cutout 106b of a rectangular shape at a bent portion 106a.

Figure 24:
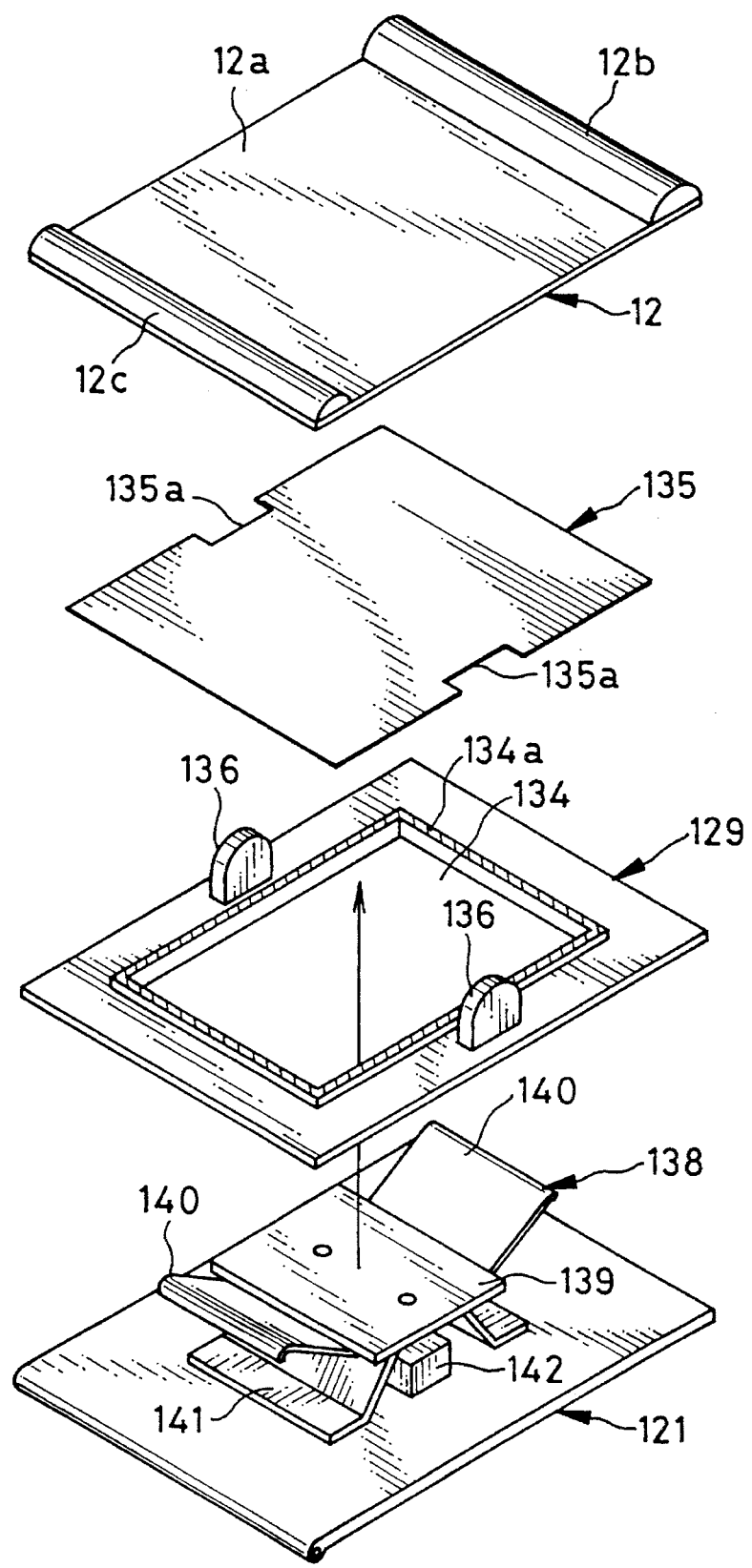
FIG. 24 is an exploded perspective view illustrating the film pack of FIG. 23.

Still another preferred embodiment is referred to now with reference to FIG. 23, in which a single pad device 138 has plural portions pressing the film units 12. Elements similar to those of the former embodiments are designated with identical reference numerals. A film pack 123 has a back wall 129b, on which a light-shielding sheet 135 seals an access opening 134. The light-shielding sheet 135 is plastic film which is stiff, resilient, and resistant to creeping, and for example of polycarbonate and polyarylate. The light-shielding sheet 135 is adhered to a ridge 134a around the access opening 134. The adhesive power of this adhesion is comparatively low, so that sufficient force applied through the access opening 134 can peel the light-shielding sheet 135 easily. As illustrated in FIG. 24, lateral edges of the light-shielding sheet 135 has positioning recesses 135a, which are fitted on projected tongues 136 formed on the back wall 129b. The light-shielding sheet 135 is slidable along the projected tongues 136. The light-shielding sheet 135 as peeled is prevented from deviation in a case 129. The projected tongues 136 are also contacted on the tenth of the film units 12 while all of them are still contained, and prevent the film units 12 from being depressed into the case 129 away from the exposure aperture 13. Note that reference numeral 129b designates a casing frame having the exposure aperture 13.

A back lid 121 has the pad device 138, which includes a middle pressure plate 139, peripheral pressure plates 140 as plate springs, a channel-like plate spring 141, and a ridge 142. The middle pressure plate 139 presses the middle of the film units 12. The peripheral pressure plates 140 are secured cured to the middle pressure plate 139, and press the pod-side edge and trap-side edge of the film units 12. The channel-like plate spring 141 keeps the middle pressure plate 139 shiftable toward and away from the back lid 121. The ridge 142 is disposed on the back lid 121 and limits the shift of the pad device 138 toward the back lid 121. Distal edges of the peripheral pressure plates 140 are bent in an arcuate shape, and prevent the film units 12 from receiving concentrated pressure in edgewise fashion.

After the loading of the film pack 123, the back lid 121 is closed. The pad device 138 is inserted into the film pack 123 through the access opening 134, and peeling the light-shielding sheet 135 away from the back wall 129b in application of pressure overcoming the adhesion with the adhesive agent. The pad device 138 indirectly presses the film units 12 against the exposure aperture 13. The middle pressure plate 139 presses the center of the film units 12 to flatten them behind the exposure aperture 13. The resiliency of the light-shielding sheet 135 and the pressure of the peripheral pressure plates 140 also push the pod-side edge and trap-side edge of the film units 12, for easy access of the solution pod 12b to the outlet slot 16 and of the claw device to the trap portion 12c.

The ten film units 12 are contained in the unused film pack 123. Note that, although the middle pressure plate 139 is retracted toward the back lid 121 against the bias of the channel-like plate spring 141, the biasing force of the channel-like plate spring 141 is kept from decreasing, because the ridge 142 limits the range of compression of the channel-like plate spring 141 by limiting the movement of the middle pressure plate 139.

Figure 25:
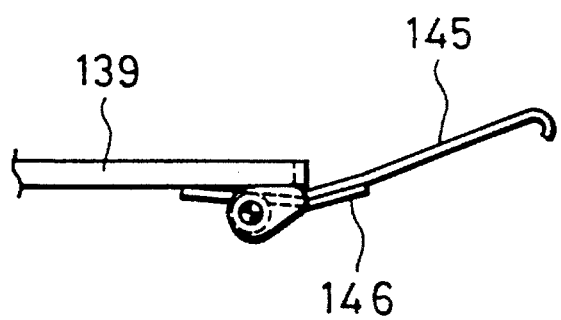
FIG. 25 is an explanatory view illustrating another preferred pad device on a back lid, including a torsion coil spring.

In the above embodiment, the pad device 138 has the peripheral pressure plates 140. Alternatively a variant pad device can have a pair of swingable pressure plates 145 biased by each torsion coil spring 146, as illustrated in FIG. 25. Reference numeral 139 designates a middle pressure plate, on which the swingable pressure plates 145 are supported.

Figure 26:
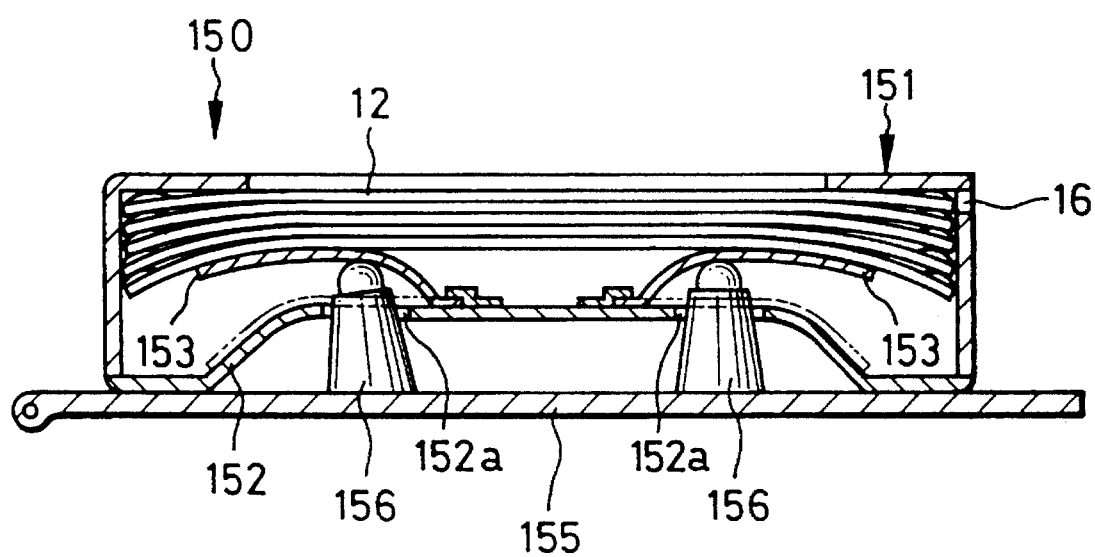
FIGS. 26 and 27 are a cross section and an exploded perspective view illustrating a further preferred film pack.
Figure 27:
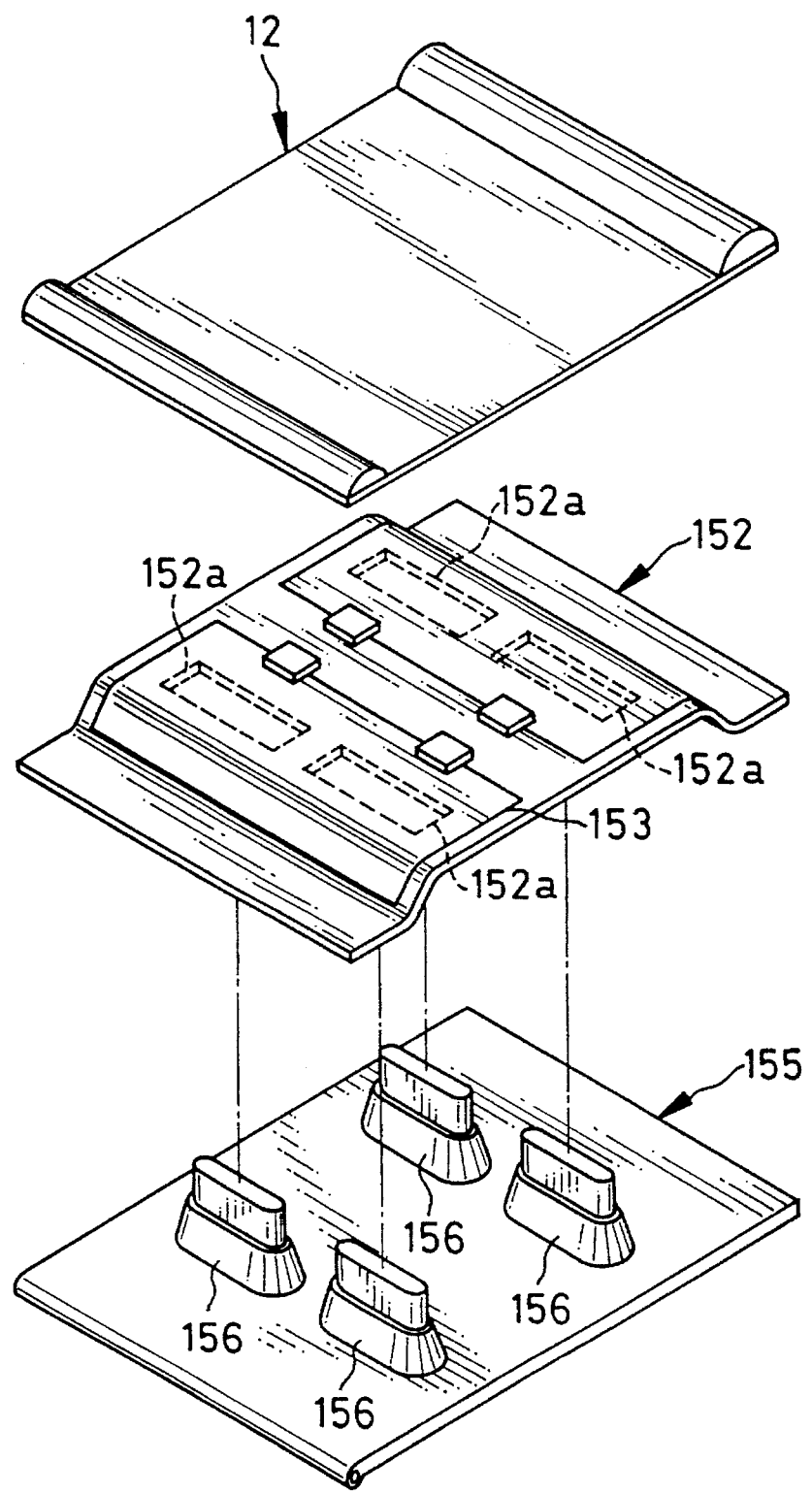

A further preferred embodiment is referred to now with reference to FIGS. 26 and 27, in which a film pack 150 includes four access openings 152a and two light-shielding sheets 153. Elements similar to those of the former embodiments are designated with identical reference numerals. A case 151 has a back wall 152, where the access openings 152a are sealed with the low-power adhesive agent by the light-shielding sheets 153 having resiliency. The light-shielding sheets 153 are secured to the middle of the back wall 152. The remaining portions of the light-shielding sheets 153 are firmly contacted on a back wall 152 with curvature, to be lightly adhered, as indicated by the phantom lines in FIG. 26. Note that the back wall 152 is adapted to curving the tenth of the film units 12 while all of them are still contained, and prevents the film units 12 from being depressed into the case 151 away from the exposure aperture 13.

Figure 28:
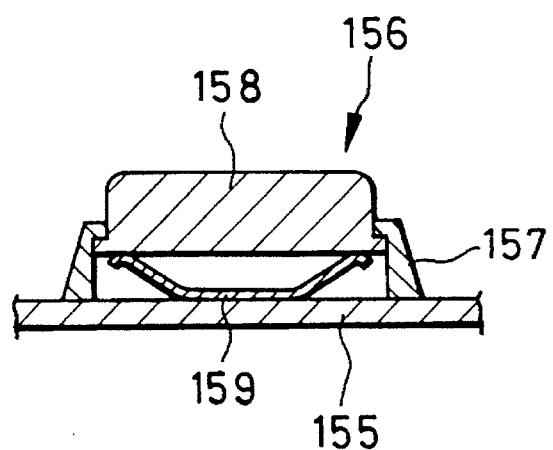
FIG. 28 is a cross section illustrating each of the pads for the film pack of the FIGS. 26 and 27.

The inner face of a back lid 155 of an instant camera is provided with pads 156 as many as the access openings 152a. In FIG. 28, the pads 156 include a pad head 158 movable through a holder 157, and a plate spring 159 disposed under the pad head 158. The pad head 158 is biased by it away from the back lid 155.

With the camera loaded with the film pack 150, the closing of the back lid 155 enters the pad 156 into the film pack 150 through the access openings 152a, to peel away the light-shielding sheets 153, which are partially pressed up, with the one edge remaining secured to the back wall 152. The resiliency of the light-shielding sheets 153 and the pressure of the pads 156 push the pod-side edge and trap-side edge of the film units 12, for easy access of the solution pod 12b to the outlet slot 16 and of the claw device to the trap portion 12c.

Figure 29:
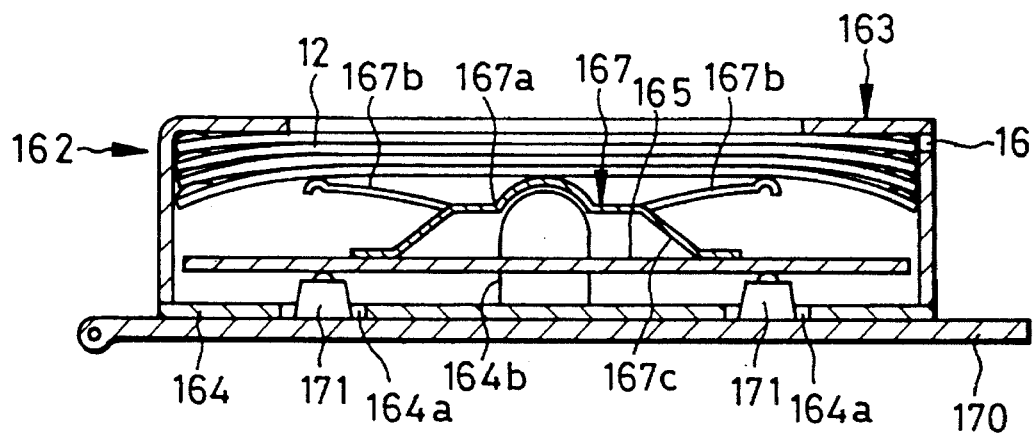
FIGS. 29 and 30 are a cross section and an exploded perspective view illustrating still another preferred film pack.
Figure 30:
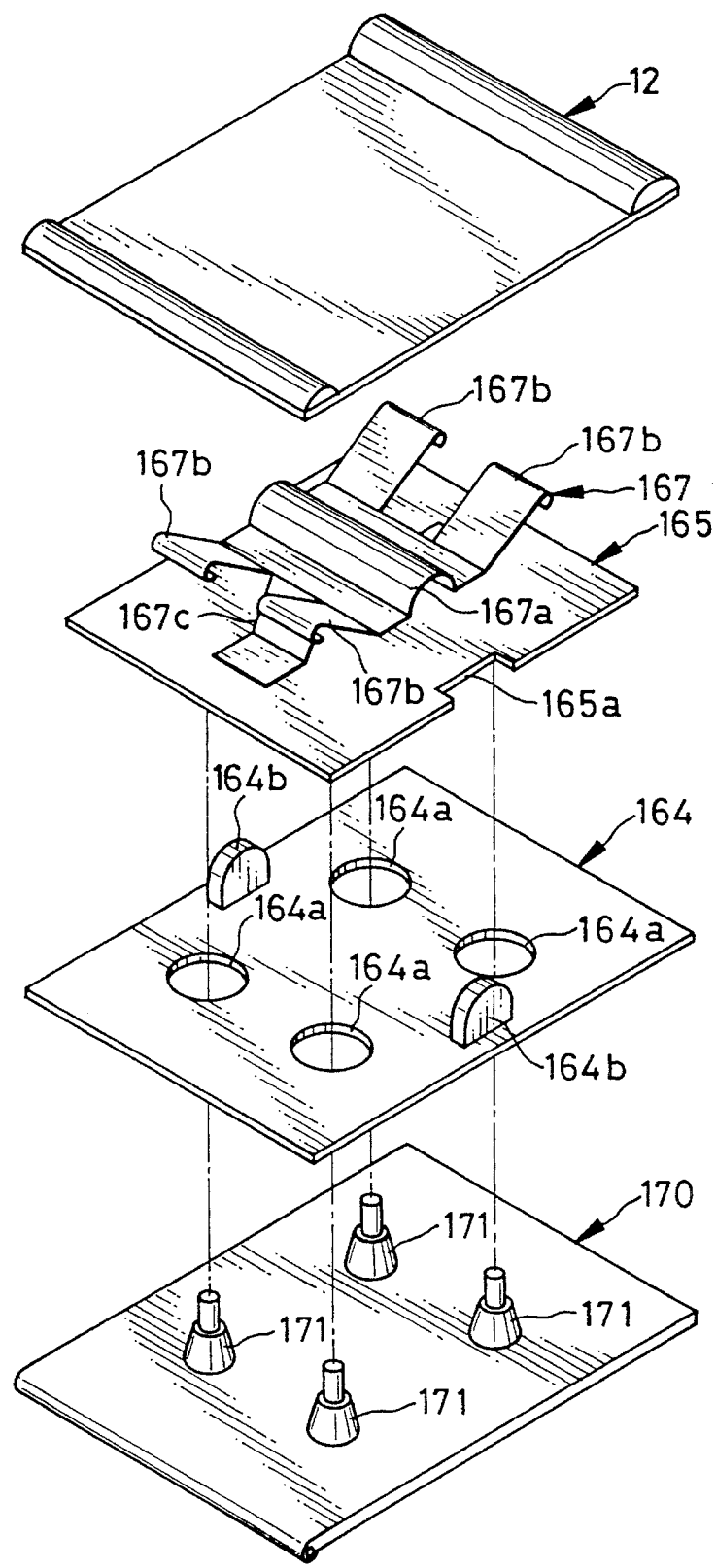

Still another preferred embodiment is described now by referring to FIGS. 29 and 30, in which a film pack 162 contains a pressing member 167. Elements similar to those of the former embodiments are designated with identical reference numerals. A case 163 has a back wall 164, where access openings 164a are sealed with the low-power adhesive agent by light-shielding plate 165. The light-shielding plate 165 is formed of the same plastics as the case 163, and as rigid as the latter. Lateral edges of the light-shielding plate 165 has positioning recesses 165a, which are fitted on projected tongues 164b formed on the back wall 164. The light-shielding plate 165 is slidable along the projected tongues 164. The light-shielding plate 165 as peeled is prevented from deviation in the case 163.

On the light-shielding plate 165 is mounted the pressing member 167 formed of plastics, hard rubber, or the like. The pressing member 167 includes an arcuate part 167a for pressing the middle of the film units 12, flap parts 167b as plate springs for pressing their pod-side edge and the trap-side edge, and a channel-like part 167c for keeping the pressing member 167 shiftable toward and away from the back lid 164. Distal edges of the flap parts 167b are bent in an arcuate shape, and prevent the film units 12 from being scratched on the flap parts 167b.

Figure 31:
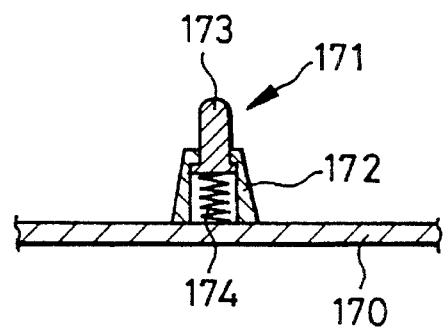
FIG. 31 is a cross section illustrating one of the pads for the film pack of FIGS. 29 and 30.

The inner face of a back lid 170 of an instant camera is provided with pads 171 as many as the access openings 164a. In FIG. 31, the pads 171 include a pad head 173 movable through a holder 172, and a compression coil spring 174 disposed under the pad head 173. The pad head 173 is biased by it away from the back lid 170.

With the camera loaded with the film pack 162, the closing of the back lid 170 enters the pad 171 into the film pack 162 through the access openings 164a, to peel away the light-shielding plate 165, which is generally pressed up. The pressing member 167 on the light-shielding plate 165 pushes the film units 12. The center of the film units 12 is pressed by the arcuate part 167a. The pod-side edge and trap-side edge of the film units 12 are pressed by the flap parts 167b, for easy access of the solution pod 12b to the outlet slot 16 and of the claw device to the trap portion 12c.

A further preferred embodiment is described now with reference to FIGS. 32 to 35, in which a back lid of an instant camera has eight pads 224 and 225 and a mask plate 227. Elements similar to those of the above embodiments are designated with identical reference numerals. A back wall 212b has a support ridge 217 extended in a direction vertical to the ejection from a film pack 206. The support ridge 217 presses the film units 12 toward the exposure aperture 13. The back wall 212b has six access holes 218 and two access openings 219 adapted to insertion of the pads 224 and 225 later to be described. A light-shielding sheet 220 has a slot 220a through which the support ridge 217 is inserted, and is adhered to the inner face of the back wall 212b. The light-shielding sheet 220 is of material which is flexible and not very stiff, and has peripheral adhering regions 221 and middle adhering regions 222, to both of which adhesive agent is applied. The peripheral adhering regions 221 are secured at sufficiently low adhesive power to the back wall 212b, and peelable when the middle of the light-shielding sheet 220 is pressed through the access holes 218. The middle adhering regions 222 are attached at high adhesive power to the back wall 212b, and resistant to force to peel. Note that reference numeral 212 designates a case, 212a a casing frame.

Figure 34:
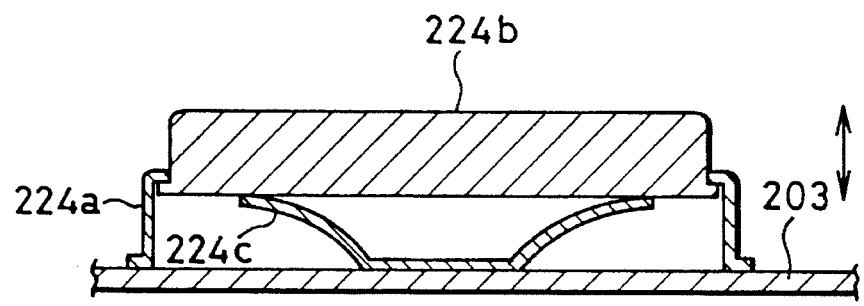
FIG. 34 is a cross section illustrating each middle pad.
Figure 33:
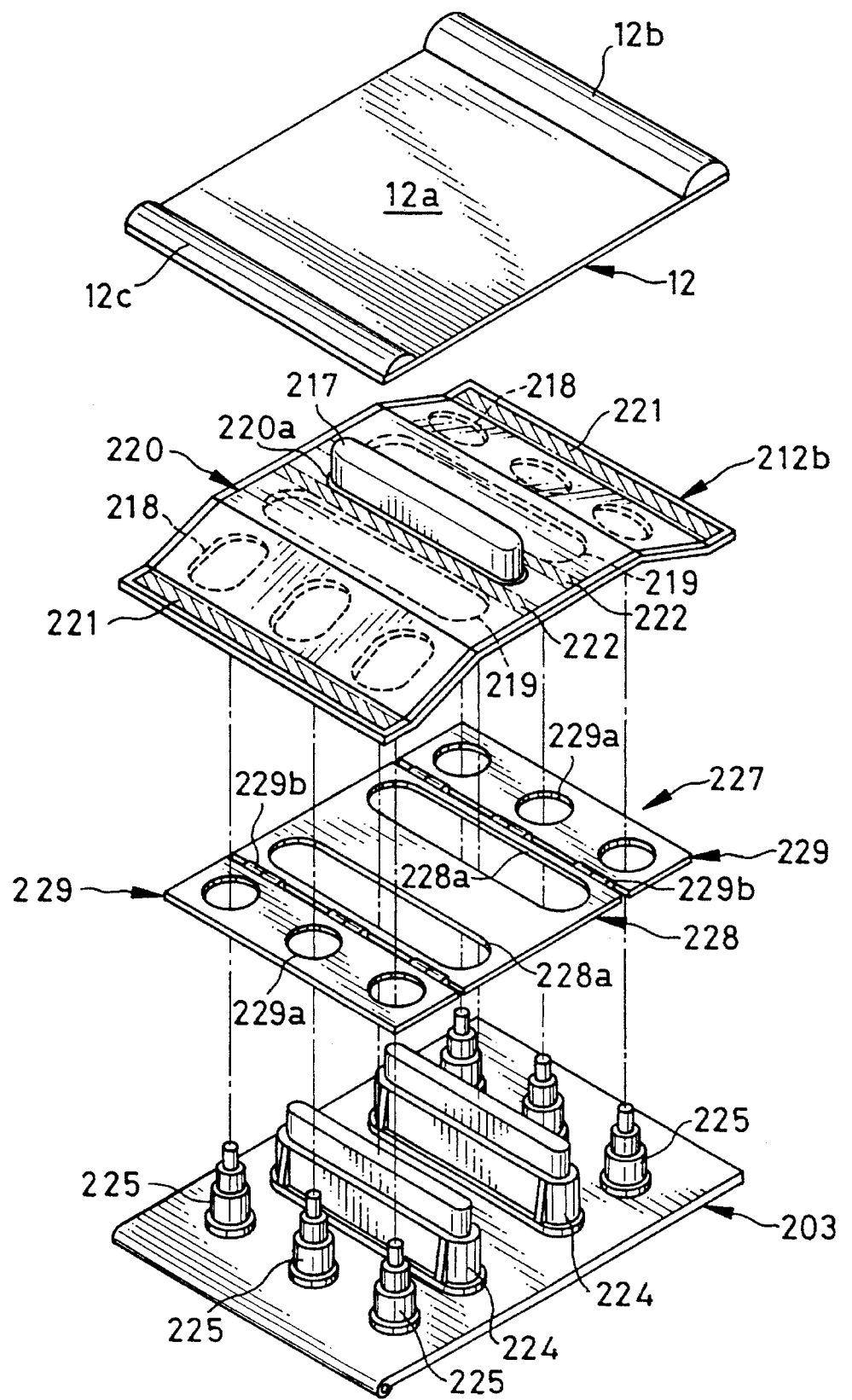
FIG. 33 is a perspective view illustrating a back lid and a mask plate of the camera, and a back wall and the film units of a film pack.
Figure 37:
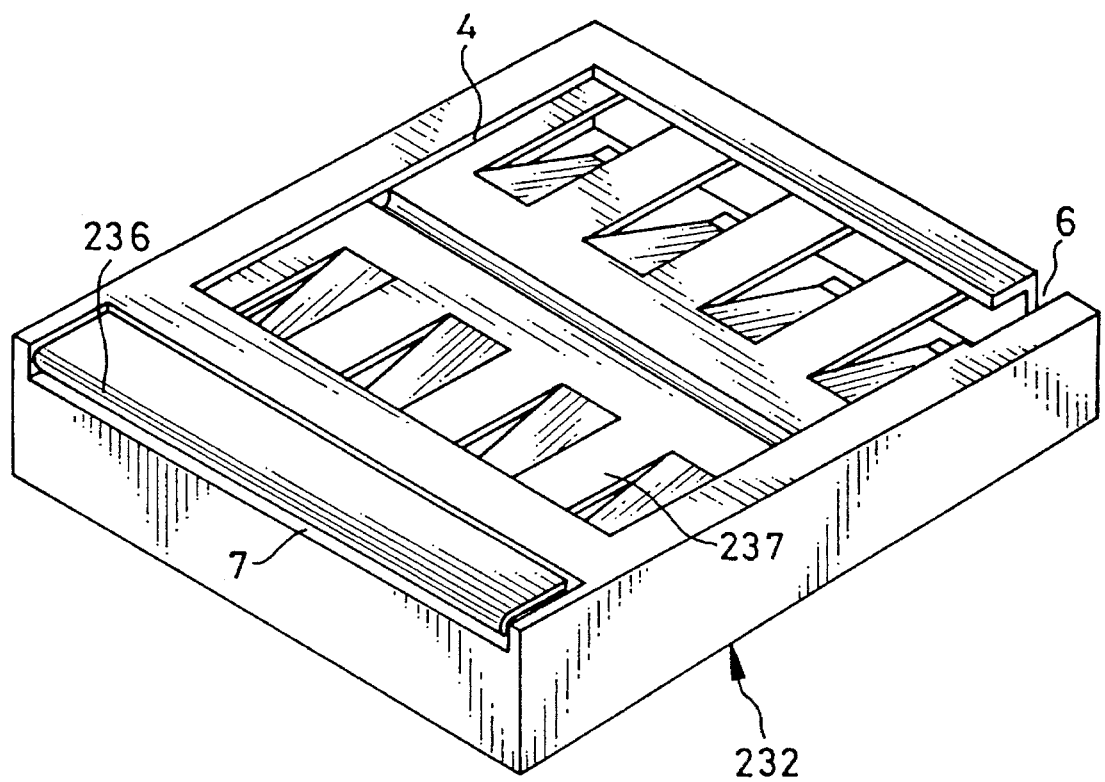
FIG. 37 is a perspective view illustrating another conventional film pack.

An inner face of a back lid 203 of an instant camera 193 has the two middle pads 224 and the six peripheral pads 225. As illustrated in FIG. 33, the middle pads 224 are extended horizontally. In FIG. 34, the middle pads 224 include a pad head 224b slidable in a holder 224a and biased by a plate spring 224c to a front. The middle pads 224 enter the film pack 206 through the access openings 219, and press the middle of the film units 12 to flatten them behind the exposure aperture 13. Note that reference numeral 204 designates a loading chamber.

Figure 35:
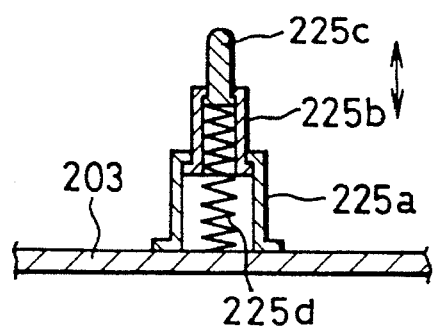
FIG. 35 is a cross section illustrating each peripheral pad.

As illustrated in FIG. 33, the peripheral pads 225 are disposed above and under the middle pads 224. In FIG. 35, the peripheral pads 225 include a bush 225b slidable in a holder 225a on the back lid 203, and a pad head 225c slidable in the bush 225b and biased by a compression coil spring 225d to a front. The peripheral pads 225 enter the film pack 206 through the access holes 218, and press the pod-side edge and the trap-side edge of the film units 12. Note that each of the peripheral pads 225 is projected to a greater extent in free state than each of the middle pads 224. Therefore the solution pod 12b and the trap portion 12c can be kept flat during ejection of each of the film units 12. Also each of the peripheral pads 225 is provided with biasing force smaller than each of the middle pads 224. Should the former have excessive biasing force, the solution pod 12b would be deformed and likely to fail to pass through the outlet slot 16 with reliably small resistance. However the peripheral pads 225 have the small biasing force, which helps prevent the solution pod 12b from deformation in contact with the peripheral pads 225.

On the inner face of the back lid 203, the mask plate 227 is mounted to mask the pads 224 and 225. As illustrated in FIG. 33, the mask plate 227 is constituted by a base segment 228 and two auxiliary segments 229. In the base segment 228 is formed two through openings 228a. Three through holes 229a are formed in the auxiliary segments 229, which are swingable on the base segment 228 via hinges 229b. The base segment 228 and the auxiliary segments 229 are movable toward and away from the back lid 203, to which the base segment 228 is connected via springs 230 in FIG. 32. Note that the springs 230 are eliminated from FIG. 33 for convenience in illustration.

The mask plate 227 is so mounted that, when the back lid 203 is open, the mask plate 227 is located to be nearly flush with tops of the pads 224 and 225. The mask plate 227 masks the pads 224 and 225, and operates for facilitating the loading of the film pack 206 and for esthetically agreeable appearance of the inside of the back lid 203.

After the loading of the film pack 206, the closing of the back lid 203 causes the mask plate 227 to contact the back wall 212b. The base segment 228 and the auxiliary segments 229 are pressed by the back walls 212b, are retracted against the bias of the springs 230, and comes nearer to the back lid 203. In the course of this, the auxiliary segments 229 are swung about the hinges 229b, and contacted on slant portions of the back wall 212b. The retraction of the mask plate 227 inserts the middle pads 224 into the through openings 228a and the peripheral pads 225 into the through holes 229a. The pads 224 and 225 are entered into the film pack 206 through the access holes 218 and the access openings 219, at the same time as the peripheral adhering regions 221 are peeled away from the bottom plate 212b. The middle pads 224 press up the center of the film units 12 indirectly via the light-shielding sheet 220, and flatten the film units 12 behind the exposure aperture 13. The peripheral pads 225 press up the pod-side edge and the trap-side edge of the film units 12, for easy access of the solution pod 12b to the outlet slot 16 and of the claw device to the trap portion 12c.

In the above, the two middle pads 224 and the six peripheral pads 225 are used. Alternatively pads in different number can be used in adaptation to the size of the film units or the like. The light-shielding sheet 220 may be of plastics or paper, which can have a color adequate for shielding ambient light, and can have low stiffness.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant film pack for use with an instant camera, comprising:

a case, having a box-shape including a back wall and a front wall in which an exposure aperture is formed;

N rectangular film units stacked and contained in said case;

an outlet slot, formed in said case, for exiting one of said film units positioned on said exposure aperture after exposure;

at least one access opening, formed in said back wall of said case, for receiving entry of a pad device of said camera;

a substantially rectangular flat light-shielding member, contained in said case and between said back wall and said film units, to close said access opening openably, for preventing ambient light from entering said case through said access opening, said light-shielding member pressed by said pad device when said pad device is entered through said access opening, said film units pressed via said light-shielding member toward said exposure aperture; and a pressing projected portion, projected from at least a portion of said back wall in an arcuate shape, for contacting at least two lateral edges of said film units or said light-shielding member, while said N film units are contained in said case, said pressing projected portion preventing said film units from being depressed to a rear of said exposure aperture inside said case.

2. An instant film pack as defined in claim 1, further comprising a cutout, formed in said case and opposite to said outlet slot, for receiving entry of a claw device of said camera, to eject said film units after exposure through said outlet slot.

3. An instant film pack as defined in claim 2, further comprising a light-shielding cover, contained in said case and disposed between said front wall and said film units, for closing said exposure aperture, to protect said film units from ambient light applied into said exposure aperture before loading said camera with said case.

4. An instant film pack as defined in claim 3, wherein said film units are of a self-processing type, have a solution pod containing processing solution, and include a first edge disposed with said solution pod closely to said outlet slot, a second edge disposed opposite to said first edge, and an image-recording portion disposed between said first and second edges; and while said N film units are contained in said case, said pressing projected portion presses in curving fashion one of said film units closest to said back wall so as to flatten one of said film units positioned on said exposure aperture.

5. An instant film pack as defined in claim 4, wherein said light-shielding member has two distal edges, which resiliently press said film units when said light-shielding member is pressed by said pad device.

6. An instant film pack as defined in claim 4, further comprising a positioning recess formed in said lateral edges of said light-shielding member;

wherein said pressing projected portion is fitted in said positioning recess for preventing said light-shielding member from deviating in said case.

7. An instant film pack as defined in claim 6, wherein said light-shielding member is a single rigid light-shielding plate; further including a non-metallic pressing member, secured to said light-shielding plate, pressed against said film units by said pad device pressing said light-shielding plate, for pressing said film units against said exposure aperture.

8. An instant film pack as defined in claim 7, wherein said access opening comprises plural access openings formed in said back wall;

said pressing member includes: a middle pressing portion, mounted on said light-shielding plate, for pressing a middle of said film units; and a peripheral pressing portion, formed with said middle pressing portion, for pressing a periphery of said film units, said peripheral pressing portion having an edge bent in an arcuate shape for protecting said film units from being scratched; and said middle pressing portion includes: a channel-like plate spring part, having resiliency, bent in a channel shape, and mounted in a middle of said light-shielding plate, said channel-like plate spring part defining a rectangular space internally and being flexible toward said light-shielding plate; and an arcuate part formed on a middle of said channel-like plate spring part, and pressed against said film units.

9. An instant film pack as defined in claim 4, wherein said access opening comprises plural access openings arranged in a direction of exiting of said film units and away from one another;

said light-shielding member is a resilient light-shielding sheet, secured to said back wall fixedly in a position between said access openings, and deformed resiliently by said pad device in pressing said film units.

10. An instant film pack as defined in claim 9, wherein said back wall includes a third edge disposed closely to said outlet slot, a fourth edge disposed opposite to said third edge, and a middle portion disposed between said first and fourth edges, said middle portion is projected inside said case toward said film units to constitute said pressing projected portion; and wherein said light-shielding sheet has two distal edges, which resiliently press said film units when said light-shielding sheet is pressed by said pad device.

11. An instant film pack as defined in claim 10, wherein said light-shielding sheet comprises plural light-shielding sheets respectively adapted to closing of said plural access openings, said light-shielding sheets are secured to said back wall to be flaps at said distal edges.

12. An instant film pack as defined in claim 9, further comprising a securing pin, projected from a middle of said back wall, inserted through said light-shielding sheet, and so caulked as to fix a middle of said light-shielding sheet on said back wall.

13. An instant film pack as defined in claim 12, further comprising an auxiliary light-shielding sheet, disposed between said light-shielding sheet and said back wall, for closing said access openings, said auxiliary sheet secured to said back wall so as to locate a free end on a middle of said back wall, and said entry of said pad device depressing said free end of said auxiliary sheet away from said secured position of said light-shielding sheet.

14. An instant film pack as defined in claim 12, further comprising a support ridge projected from a middle of said back wall toward said film units, and extended substantially vertically to exiting of said film units, for preventing said film units from being depressed to a rear of said exposure aperture inside said case.

15. An instant film pack as defined in claim 14, further comprising a first slit formed in a middle of said light-shielding sheet in channel-shape to define a pressing flap, said pressing flap raised in inclination and pressed against said film units by said support ridge.

16. An instant film pack as defined in claim 15, further comprising:

a second slit, formed in said middle of said light-shielding sheet in a channel-shape and around said first slit, to define an outer flap around said pressing flap; and a retaining ridge, projected from said back wall to lie along said support ridge, and contacted on an edge of said outer flap, for retaining said edge on said back wall, said outer flap deformable resiliently and supporting said pressing flap.

17. An instant film pack as defined in claim 12, further comprising a bent portion, formed on said light-shielding sheet, located on a first edge disposed closely to said outlet slot, and/or on a second edge disposed opposite to said first edge, and bent toward said film units, for pressing said first and/or second edge of said film units.

18. An instant film pack as defined in claim 17, further comprising a slant ridge, formed on distal edges of said back wall, and projected toward said film units, said light-shielding sheet fitted on said back wall before said loading into said camera, said slant ridge fitted on said bent portion for preventing said bent portion from recovering a straight form.

19. An instant film pack as defined in claim 12, further comprising a corner retracted portion, formed at a corner of said light-shielding sheet in association with said cutout, for preventing said claw device from being blocked by said light-shielding sheet during an exit of an Nth of said film units.

20. An instant film pack as defined in claim 19, wherein said corner retracted portion is a triangular bent portion at said corner of said light-shielding sheet.

21. An instant film pack as defined in claim 19, wherein said corner retracted portion is a corner recess formed in said corner of said light-shielding sheet.

22. An instant film pack as defined in claim 21, wherein said corner recess is triangular.

23. An instant film pack as defined in claim 21, wherein said corner recess is rectangular.

24. An instant film pack for use with an instant camera, comprising:

a case, having a box-shape including a back wall and a front wall in which an exposure aperture is formed;

N rectangular film units stacked and contained in said case;

an outlet slot, formed in said case, for exiting one of said film units positioned on said exposure aperture after exposure;

plural access openings, formed in said back wall of said case, arranged in a direction of exiting of said film units and away from one another, for receiving entry of a pad device of said camera; and a resilient light-shielding sheet, contained in said case and between said back wall and said film units, to close said access openings openably, for preventing ambient light from entering said case through said access openings, said light-shielding sheet secured to said back wall fixedly in a position between said access openings, and pressed by said pad device when said pad device is entered through said access openings in resilient deformation, said film units pressed via said light-shielding sheet toward said exposure aperture.

25. An instant film pack as defined in claim 24, further comprising a support ridge projected from a middle of said back wall toward said film units, and extended substantially vertically to exiting of said film units, for preventing said film units from being depressed to a rear of said exposure aperture inside said case.

26. An instant film pack for use with an instant camera, comprising:
   a case, having a box-shape including a back wall and a front wall in which an exposure aperture is formed;
   N rectangular film units stacked and contained in said case;
   an outlet slot, formed in said case, for exiting one of said film units positioned on said exposure aperture after exposure;
   plural access openings, formed in said back wall of said case, arranged in a direction of exiting of said film units and away from one another, for receiving entry of a pad device of said camera;
   a light-shielding sheet, contained in said case and between said back wall and said film units, to close said access openings openably, for preventing ambient light from entering said case through said access openings, said light-shielding sheet pressed by said pad device when said pad device is entered through said access openings, said film units pressed via said light-shielding sheet toward said exposure aperture;
   a middle adhering region, defined in a middle of said light-shielding sheet, provided with adhesive agent for adhering to said back wall, and secured to said back wall fixedly in a position between said access openings;
   peripheral adhering regions, defined on said light-shielding sheet, disposed closely to said outlet slot and opposite to said outlet slot, and provided with adhesive agent for adhering to said back wall in adhesive power lower than said middle adhering portion, so as to be peelable to said pad device;
   a support ridge projected from a middle of said back wall toward said film units, and extended substantially vertically to exiting of said film units, for preventing said film units from being depressed to a rear of said exposure aperture inside said case; and
   a slot formed in said light-shielding sheet for insertion of said support ridge therethrough.

27. An instant camera for use with an instant film pack, said film packing comprising:
   a case, having a box-shape including a back wall and a front wall in which an exposure aperture is formed;
   N rectangular film units stacked and contained in said case;
   an outlet slot, formed in said case, for exiting one of said film units positioned on said exposure aperture after exposure;
   at least one access opening formed in said back wall of said case; and
   a substantially rectangular flat light-shielding member, contained in said case and between said back wall and said film units, to close said access opening openably, for preventing ambient light from entering said case through said access opening;
   said instant camera comprising:
   a loading chamber into which said film pack is inserted;
   a back lid, disposed on said loading chamber, and closed after said film pack is inserted in said loading chamber, for keeping said film pack light-tight in said loading chamber; and
   plural pad mechanisms, disposed on said back lid, entered into said film pack through said access opening in closing of said back lid, for contacting said light-shielding member, to press said film units toward said exposure aperture;
   said access opening comprising plural access openings arranged in a direction of exiting of said film units and spaced from one another;
   said light-shielding member being a resilient light-shielding sheet secured to said back wall fixedly in a position between said access openings; and
   said pad mechanisms resiliently deforming said light-shielding sheet, to press said light-shielding sheet against said film units.

28. An instant camera as defined in claim 27, further comprising a regulating projection, projected into said loading chamber, and contacted on said film pack, for preventing said outlet slot from being spread by said film units passing through said outlet slot.

29. An instant camera as defined in claim 28, wherein, while said loading chamber contains said film pack, said regulating projection further presses and deforms said film pack to narrow a middle of said outlet slot.

30. An instant camera as defined in claim 27, wherein said film pack further comprises a pressing projected portion, projected from at least a portion of said back wall in an arcuate shape, for contacting at least two lateral edges of said film units or said light-shielding member, said lateral edges directed toward said outlet slot, said pressing projected portion preventing said film units from being depressed to a rear of said exposure aperture inside said case.

31. An instant camera as defined in claim 30, wherein said film units are of a self-processing type, have a solution pod containing processing solution, and include a first edge disposed with said solution pod closely to said outlet slot, a second edge disposed opposite to said first edge, and an image-recording portion disposed between said first and second edges; and
   while said N film units are contained in said case, said pressing projected portion presses in curving fashion one of said film units closest to said back wall so as to flatten one of said film units positioned on said exposure aperture.

32. An instant camera as defined in claim 31, wherein said light-shielding member has two distal edges, which resiliently press said film units when said light-shielding member is pressed by said pad mechanisms.

33. An instant camera as defined in claim 31, wherein said pad mechanisms include:
   a tubular holder member mounted on said back lid;
   a head member, contained in said holder member in slidable fashion; and
   a compression spring, contained in said holder member, for biasing said head member in fashion projected over said back lid.

34. An instant camera as defined in claim 33, wherein said pad mechanisms comprise two pad mechanisms, and are arranged in a direction of exiting of said film units.

35. An instant camera as defined in claim 34, wherein said pad mechanisms comprise four pad mechanisms, and are arranged in two lines in a direction of exiting of said film units.

36. An instant camera as defined in claim 31, wherein said light-shielding member is a resilient light-shielding sheet; and
   said pad mechanisms include: a first pressure plate, mounted in a middle of said back lid, for pressing a middle of said light-shielding sheet; and second and third inclined pressure plates, located beside said first pressure plate, for pressing a periphery of said light-shielding sheet.

37. An instant camera as defined in claim 36, wherein said second and third pressure plates are mounted on said first pressure plate, and biased by a torsion coil spring toward said film units in swingable fashion.

38. An instant camera as defined in claim 31, wherein said light-shielding member is a light-shielding sheet;
   said access opening comprises plural access openings formed in said back wall; and
   said pad mechanisms include: a middle pad mechanism, mounted in a middle of said back lid, for pressing a middle of said light-shielding sheet; and a peripheral pad mechanism, mounted on a periphery of said back lid, for pressing a periphery of said light-shielding sheet.

39. An instant camera as defined in claim 38, wherein said peripheral pad mechanism has lower biasing force than said middle pad mechanism, and is projected at a greater height than said middle pad mechanism.

40. An instant camera as defined in claim 39, further comprising:
   a mask plate mounted on said back lid with said middle and peripheral pad mechanisms; and
   through openings formed in said mask plate in association with said middle and peripheral pad mechanisms, wherein said mask plate in a masking position substantially covers said central and/or middle pad mechanism, and said mask plate in an unmasking position comes close to said back lid with said middle and peripheral pad mechanisms inserted into said through openings, said mask plate is in said masking position while said back lid is open, and said mask plate is in said unmasking position while said back lid is closed with said film pack contained in said loading chamber.

41. An instant camera for use with an instant film pack, said film pack comprising:
   a case, having a box-shape including a back wall and a front wall in which an exposure aperture is formed;
   N rectangular film units stacked and contained in said case;
   an outlet slot, formed in said case, for exiting one of said film units positioned on said exposure aperture after exposure;
   plural access openings, formed in said back wall of said case, and arranged in a direction of exiting of said film units and away from one another; and
   a resilient light-shielding sheet, contained in said case and between said back wall and said film units, to close said access openings openably, secured to said back wall fixedly in a position between said access openings, for preventing ambient light from entering said case through said access openings;
   said instant camera comprising:
      a loading chamber into which said film pack is inserted;
      a back lid, disposed on said loading chamber, and closed after said film pack is inserted in said loading chamber, for keeping said film pack light-tight in said loading chamber; and
      a pad device, disposed on said back lid, entered into said film pack through said access openings in closing of said back lid, for contacting said light-shielding sheet in resilient deformation, to press said film units toward said exposure aperture.

42. An instant camera for use with an instant film pack, said film pack comprising:
   a case, having a box-shape including a back wall and a front wall in which an exposure aperture is formed;
   N rectangular film units stacked and contained in said case;
   an outlet slot, formed in said case, for exiting one of said film units positioned on said exposure aperture after exposure;
   plural access openings, formed in said back wall of said case;
   a resilient light-shielding sheet, contained in said case and between said back wall and said film units, to close said access openings openably, for preventing ambient light from entering said case through said access openings; and
   a pressing projected portion, projected from at least a portion of said back wall in an arcuate shape, for contacting at least two lateral edges of said light-shielding sheet, said lateral edges directed toward said outlet slot, said pressing projected portion preventing said film units from being depressed to a rear of said exposure aperture inside said case;
   said instant camera comprising:
      a loading chamber into which said film pack is inserted;
      a back lid, disposed on said loading chamber, and closed after said film pack is inserted in said loading chamber, for keeping said film pack light-tight in said loading chamber; and
      a pad device, disposed on said back lid, entered into said film pack through said access openings in closing of said back lid, for contacting said light-shielding sheet in resilient deformation, to press said film units toward said exposure aperture.

43. An instant camera for use with an instant film pack, said film pack comprising:
   a case, having a box-shape including a back wall and a front wall in which an exposure aperture is formed;
   N rectangular self-processing film units stacked and contained in said case;
   plural access openings, formed in said back wall of said case;
   a single light-shielding plate, contained in said case and between said back wall and said film units, to close said access openings openably, for preventing ambient light from entering said case through said access openings; and
   a non-metallic pressing member, secured to said light-shielding plate, and pressed against said film units by external pressure to said light-shielding plate;
   said instant camera comprising:
      a loading chamber into which said film pack is inserted;
      a back lid, disposed on said loading chamber, and closed after said film pack is inserted in said loading chamber, for keeping said film pack light-tight in said loading chamber; and
      a pad device, disposed on said back lid, entered into said film pack through said access openings in closing of said back lid, for pushing said light-shielding plate in uniform fashion, to cause said pressing member to press said film units toward said exposure aperture.

* * * * *